Aug. 11, 1942.  B. H. MOSSINGHOFF  2,292,538
AUTOMOBILE DRIVING RATIO CHANGE SYSTEM
Filed Nov. 26, 1937  5 Sheets-Sheet 1

INVENTOR.
Bernard H. Mossinghoff

Aug. 11, 1942.  B. H. MOSSINGHOFF  2,292,538
AUTOMOBILE DRIVING RATIO CHANGE SYSTEM
Filed Nov. 26, 1937   5 Sheets-Sheet 2

INVENTOR.
Bernard H. Mossinghoff

Aug. 11, 1942.  B. H. MOSSINGHOFF  2,292,538
AUTOMOBILE DRIVING RATIO CHANGE SYSTEM
Filed Nov. 26, 1937     5 Sheets-Sheet 3

INVENTOR.
Bernard H. Mossinghoff

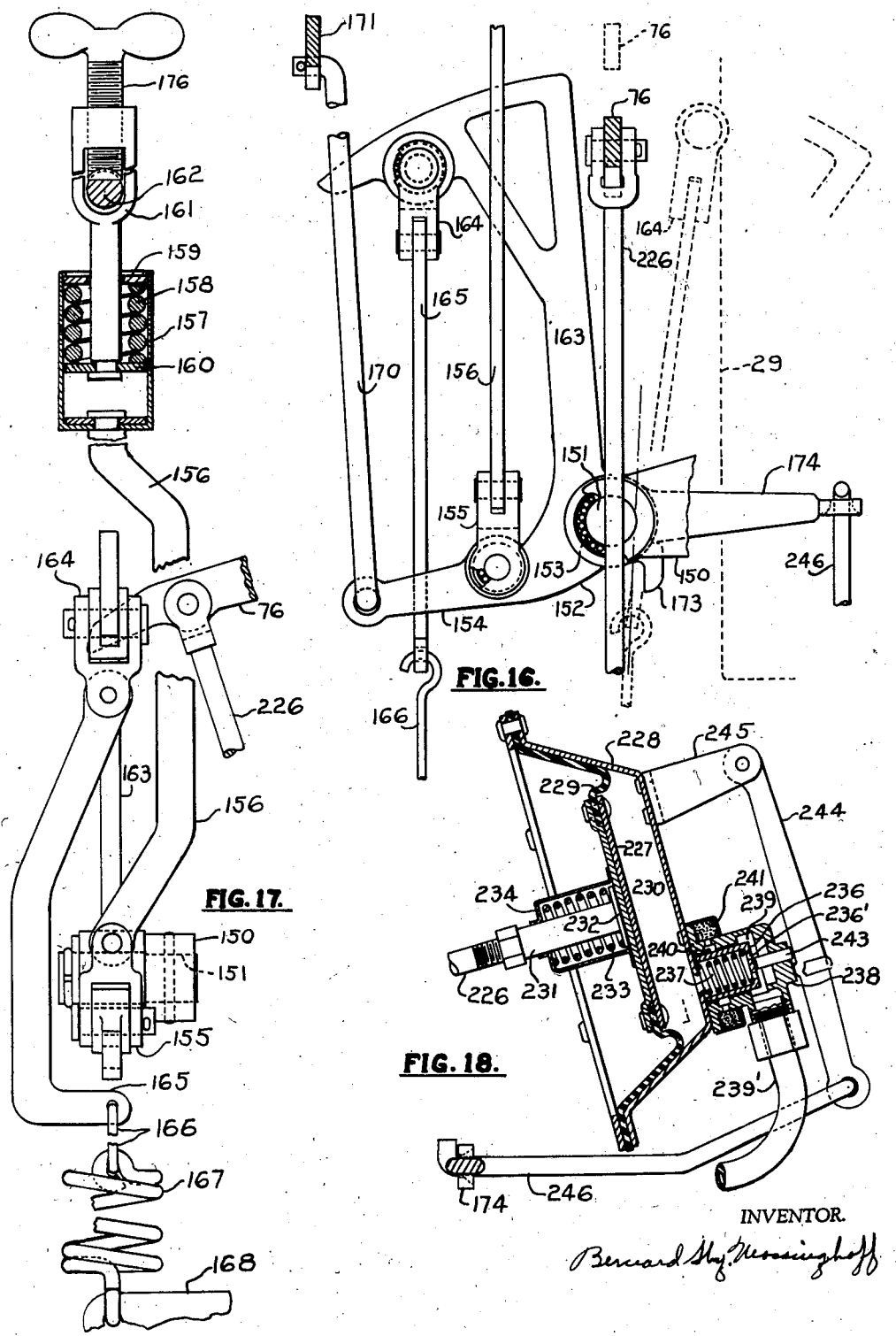

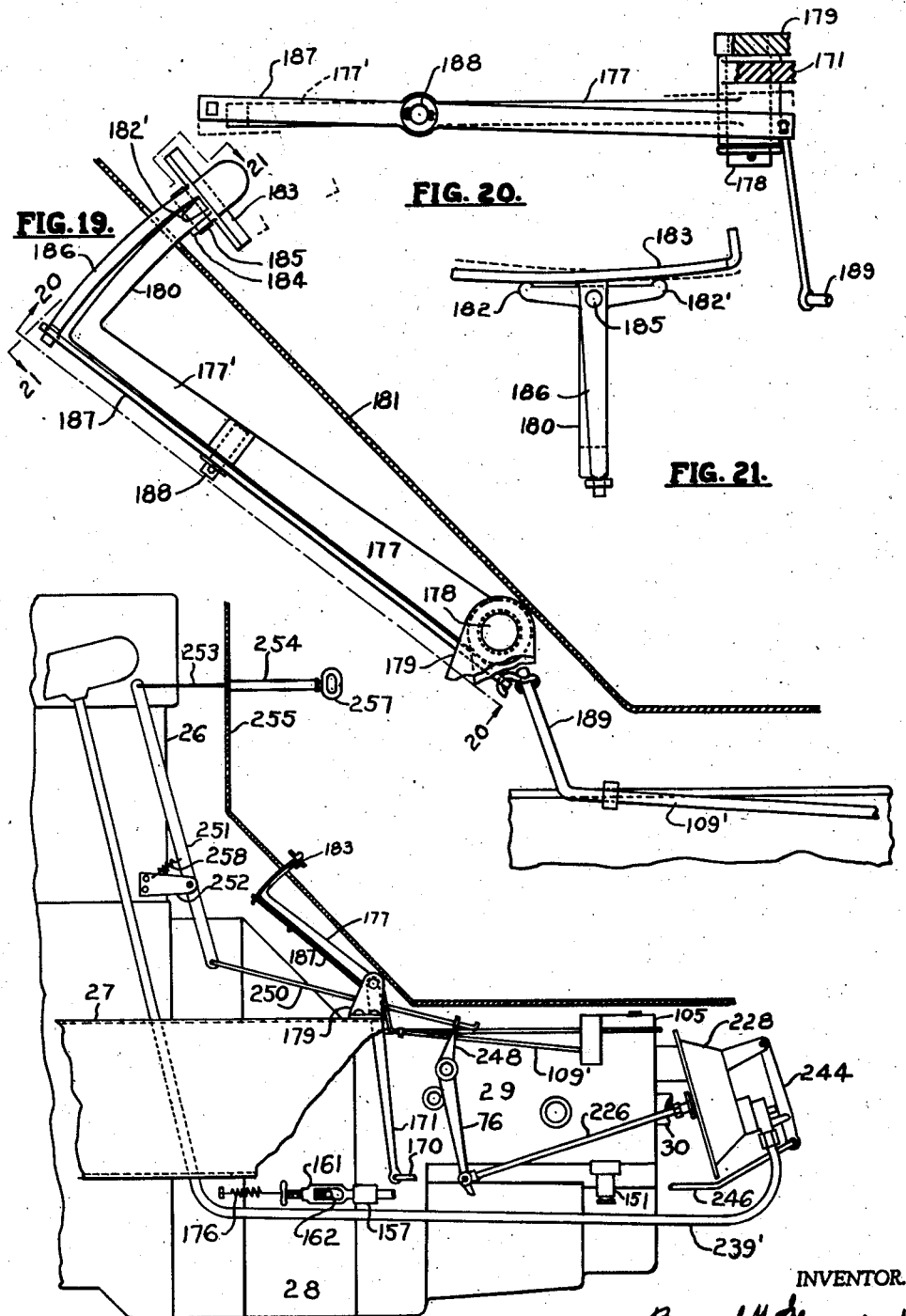

Patented Aug. 11, 1942

2,292,538

UNITED STATES PATENT OFFICE 2,292,538

AUTOMOBILE DRIVING RATIO CHANGE SYSTEM

Bernard H. Mossinghoff, Chicago, Ill.

Application November 26, 1937, Serial No. 176,501

32 Claims. (Cl. 192—3.5)

My invention relates to systems of control, by which driving ratio changes are obtained principally in self-propelled vehicles. Particularly it refers to mechanisms and controls therefor, for changing the driving gear ratios in an automobile transmission and concomitantly operating the customary driving clutch, simultaneously by one control operation. This is a "continuation in part" of my application filed July 15, 1935, Serial No. 31,428. Reference is further made to patent numbered 2,008,149, issued on July 16, 1935, on my application.

A cardinal objective apparently to be attained in automobile ratio change control improvements, respects the relation of the automobile driver to the car, by providing control simplification and convenience for him, in addition to the requirements of proper responsiveness and maneuverability of the car itself. The incidental objective of clearing the front compartment floorboard from obstructions, is attainable by simple and inexpensive devices known in the art and respect primarily a transposition of the control levers. As to simple and inexpensive objective device structures, for accomplishing gear ratio changes, the hitherto commonly conventional gear transmission, and clutch with its conventional pedal, appears not easily surpassed by any of the radical improvements hitherto presented from the viewpoint of commercial device simplicity, durability, inexpensiveness, etc. The chief objective, accordingly, seems to aim beyond the mere devices themselves, and respects primarily the drivers' relation to their control, or to the car operation.

My invention provides the employment of the hitherto approved simple transmission and clutch units, but joins their controls into one controller pedal of conveniently short stroke, so that it may serve as a foot-rest; and which pedal is arranged so that by a simple reciprocal motion, a practical range of ratio selectivity is afforded to the driver; the ratio change being effected at will of the driver for best car performance. The hands remain fully free except for the reverse ratio determination. And through special arrangements the traffic requirement variables are provided for in a practical manner.

To serve operative control simplification for the driver, an automatic selection or ratio determination mechanism is provided, which automatically alternates the intermediate and the high driving ratios, upon repetition of the identical control operation on the part of the driver, namely, upon the depression of the solitary control pedal by predominant foot pressure on one side of the slightly laterally yieldable foot-pad; and similarly automatically alternates the neutral and low ratios upon foot pressure or tilt on the other side of the foot-pad. The operation is that of a simple reciprocal foot stroke.

To provide a small foot-work factor, permitting a conveniently short stroked foot-rest pedal, I provide a declutching assister, which has the prime function of transferring the usual clutch spring energy to a specially constructed device for temporary energy storing, so that it can be retransferred for reuse to the clutch proper, instead of the hitherto employed principle of resupplying such energy by muscular exertion by the driver. The graduation and variations of the tensions are brought in harmony for convenient pedal feel and effective operation.

One of the chief objects of my invention is to simplify and render more convenient the efficient control of the automobile from the standpoint of the driver, by providing improved means for reducing the conventional ratio changing operation including that of clutch disengagement to a single convenient foot movement of the driver, allowing the hands to be free.

Another object is to provide power actuation to perform the shift operation, instead of muscular energy.

Another object is to simplify the subsequent ratio determination function in a single lever controlled and powered device by providing automatic alternation between certain ratios with identical operation by the driver.

Another object is to provide in an automatic alternating ratio transmission prior synchronization of the engaging gears.

Another object is to provide with a reciprocating lever control, for the synchronization to be effective during the time the lever changes its directions thus allowing a natural pause and time for the synchronization function.

Another object is to provide in an automatic alternating type of ratio change device, for a definite ratio always to precede the other independently of the prior status of the device, in respect to the series of alternations, as securely obtaining intermediate speed before high, or neutral before low, for reasons of certainty and of traffic requirements.

Another object is to provide in a solely foot controlled device for neutral and forward speeds, a special operable reverse, preferably a hand operation, for reasons of normal control simplicity and of avoiding dangerous errors.

Another object is to provide a tiltable ratio selection pedal plate having two positions yieldable laterally, accordingly conveniently operable by either a long- or a short-legged driver.

Another object is to provide optional human actuation of the device in case the power fails.

A further object is to provide in a driving ratio changing system, clutch control structure, whereby the substantially tensioned conventional-like clutch is operable by a convenient short stroke of the solitary control pedal, without the assistance of power; and further whereby a relatively large portion of the clutch operating stroke of said control pedal is devoted to the variable pressured clutch plate engagement stage of the clutch engagement function for efficiency of variable control, in view of the short-stroked foot-rest pedal. Provision is also made for foot-rest practicality versus the usual "clutch-riding" evils.

Another object is to provide a lightly yieldable and short movement selection control on such pedal operable by the driver for the ratio determination mechanism and by power actuation for the heavier operation movement.

Another object is to provide in an automatic ratio alternating transmission, informative indication to the driver of the status of the device.

Another object is to provide built-in constructions sealed against external grit; to provide separation of the lightly energized ratio determination mechanism in a compartment virtually inaccessible to the heavier congealable gear lubricant; and to provide efficient mechanical constructions and relations generally.

One object is to provide an automobile ratio change control system, which in its interfunctioning harmonizes the several sub-functions relatively so that the several objects are attainable with due regard to desired car maneuverability, to practical traffic conditions, to control simplicity and convenience, in a single self-sufficient selective unitary machine, as operable by a single control member and predominantly by a simple reciprocal small-duty motion of the driver's foot.

With these and other objects in view, I present a preferred embodiment in the accompanying drawings, in which:

Fig. 16 is a plan view of the clutch disengagement assister, mounted to the left of the transmission case, from a bracket integral therewith.

Fig. 17 is a left side view of the same assister of Fig. 16 with added connection to the clutch throw-out rod at the upper end of the view, and with the energy storing spring, as affixed to the chassis frame to the rear of the car, at the lower end of the view.

Fig. 18 is a cross-sectional view of the vacuum actuated ratio effecting diaphragm motor and the associated valve, presented in the view as somewhat axially turned from its natural position in order to present a cross-sectional view of the valve in the same view plane.

Fig. 19 gives left side elevational view of the control pedal with its selectively tiltable foot plate, the automobile floor board being in section.

Fig. 20 is bottom view of the control pedal viewed from line 20—20 of Fig. 19.

Fig. 21 is the forward end view of the control pedal viewed from the line 21—21 of Fig. 19.

Fig. 22 is a composite view of the several associated devices on the power unit of the automobile, the clutch assister mechanism having been removed from its pivot pin and not shown.

Figure 9:
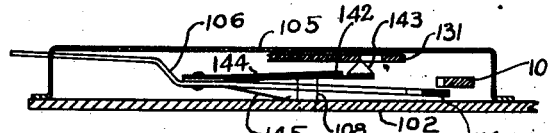
Fig. 9 is a rear elevational view of the check bar and its associated parts of the automatic selection mechanism, taken along the line 9—9 of Fig. 7, but with the enclosure top added, and with the check bar moved into a lower level (intermediate ratio) position.
Figure 10:
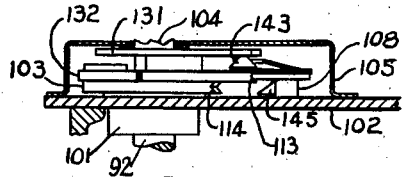
Fig. 10 is a right elevational view of the automatic selection mechanism, taken along the line 10—10 of Fig. 7.
Figure 11:
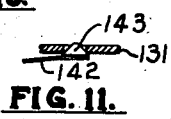
Fig. 11 is a detail of the automatic selection mechanism showing how the registering cone projects into an orifice of the setting plate, for positioning the check bar in an upper level position.
Figure 12:
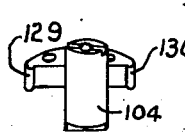
Fig. 12 is a perspective view of the stub shaft detail of the automatic selection mechanism.
Figure 13:
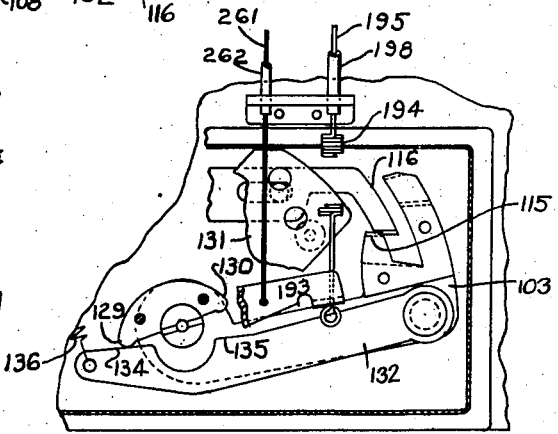
Fig. 13 is a fragmentary plan view of the automatic selecting mechanism, with the enclosure top removed, and with parts shown in the position of low driving ratio selection by pedal control, but in an effectually reverse ratio selection upon operation of the manual reverse pull-out (on the instrument panel), indicating how the manual reverse predominates for selection determination.

In the drawings all of the views, except those of Figs. 9, 11 and 13 (which show parts of the automatic determination mechanism in various positions) in their full lines, present the mechanisms consistently in the same operative condition. The nature of the device is such that depression of the control pedal disengages the prior ratio gears, by positive vacuum actuation, and the return of the control pedal effects the engagement of the new ratio, by spring actuation upon release of the vacuum pressure. The position shown in the drawings is that of the control pedal fully depressed, with the vacuum power operative so as already to have brought the shift mechanism to the position of completed gear disengagement, but with the power actuation arrested in its same directional movement at this gear disengaged point, so as not yet to have effected the synchronization of the newly selected high gear ratio, though the synchronizing mechanism is already selectively set for such high gear synchronization. The high gear ratio selection has already been set, as subsequent to the immediately prior intermediate gear ratio driving.

Upon continuation of the operation from the shown position, the vacuum power motor would continue its power stroke, thereby effectuating the already selected high gear synchronization, whereupon the mechanism would cease to move farther, unless the foot releases the control pedal, with the result that the vacuum power is closed off and the vacuum motor brought to exhaust position, thus permitting the main actuating spring to first release the synchronizer, and then engage the newly selected high ratio gear. Thereupon the clutch would reengage, which latter engagement is graduated according to the position and return progress of the control pedal.

Referring to the composite view of Fig. 22, 26 represents the engine of the automobile suspended from the chassis frame designated as 27. Affixed as conventionally to the rear of the said engine 26, is the clutch housing 28 enclosing the customary clutch members; to which clutch housing is integrally cast the transmission case 29, from the rear of which projects the propeller shaft 30 driving the rear wheels of the automobile in customary manner.

The transmission unit

The driving gear sets of the preferred form of my invention, as illustrated, are functionally and generally structurally identical to those employed in the Buick automobiles, particularly of the model year 1932. The pinion 31 is driven by the clutch and in turn drives the gear 31a of the customary countershaft (not shown). Co-axial with said pinion 31 is the splined shaft 32 onto which is slidingly mounted the low-reverse gear 33, movable forwardly (leftward in Fig. 1) for the low driving gear ratio and rearwardly for the reverse driving gear ratio, as conventionally, by means of the yoke 34 formed integral with the shift member 35 pinned fixedly on the rod 36 slidingly mounted in bores of the bosses 37 and 38 formed integral with the transmission case 29. Revolvably but not slidably mounted on a bearing bushing on the splined shaft 32 is the constant mesh intermediate gear 39, which meshes with the above indicated counter-shaft (not shown) which gear 39 has the internal dog clutch teeth 40 formed thereon for engagement by the corresponding external teeth 41 formed on the dog clutch member 42 sliding in the splines of the aforesaid shaft 32, and accordingly rotatable therewith. On the forward end of said member 42 are similar external dog clutch teeth 43 for cooperative engagement with the internal teeth 44 formed integral with the pinion 31. Said member 42 is made axially slidable through the agency of three radial equally spaced prongs as 45, formed integral therewith onto which prong members is fixedly mounted the cylindrical ring 46, having the annular flange 47 to register in corresponding grooves in the yoke member 48 formed integral with the shift member 49 pinned onto the slide rod 50, slidable in longitudinal bores in the aforesaid bosses 37 and 38.

Provision is made for pre-synchronization of gears for the intermediate and the high driving ratios, by means of the cylindrical drum 51, in the sides of which are three elongated slots as 52 to accommodate the aforesaid three prongs 45 and permit axial relative slidability therefor. At the rear end of the cylindrical drum 51 is fixed the annular conically surfaced friction liner 53 adapted to friction as a cone friction clutch member on the co-acting conically surfaced annular male friction portion formed on the intermediate gear 39. Similarly at the forward end of the said synchronizing drum 51 is fixedly mounted the annular conically surfaced friction liner 55 for similar friction engagement with the corresponding conical surface formed integral with the pinion 31. In order to slide this synchronizing drum axially for engagement with the above-named conical friction surfaces, I provide the annular channelled groove member 56 affixed to the periphery of the aforesaid drum 51, to accommodate a friction shoe 57, the operation of which will later be explained.

The substantial parts of the transmission so far described are similar and in most part identical with the transmission parts employed in the recent Buick automobiles. However, I have provided for separate axial actuation of the dog clutch member 42 and of the synchronizing drum 51, by providing the additional annular groove member 56 for cooperation with a shoe and its actuating train and by eliminating Buick's direct actuating interconnections between the said drum and dog clutch member 42. Furthermore, I have located the slide rods towards the side of the transmission instead of immediately above the gears.

The shifting mechanism

Figure 3:
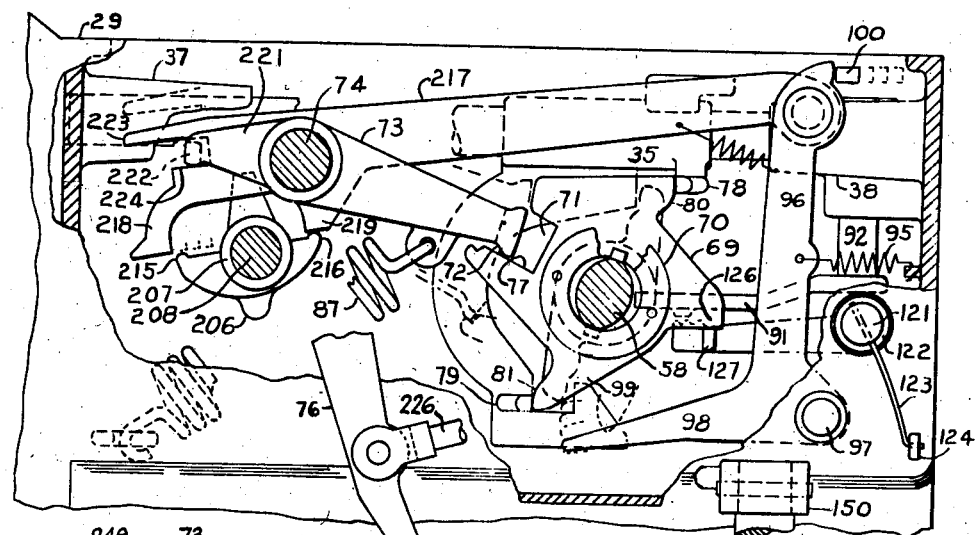
Fig. 3 is a left side elevational view of the actuating levers and cam system in the transmission case taken along the line 3—3 of Fig. 1.
Figure 4:
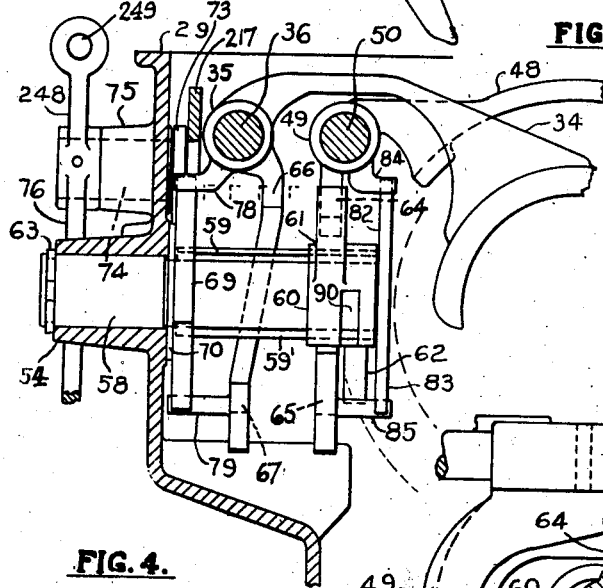
Fig. 4 is a sectional elevational view from the rear, of the shift members, of the shifter and of the rock shaft operating them, taken along line 4—4 of Fig. 1.
Figure 5:
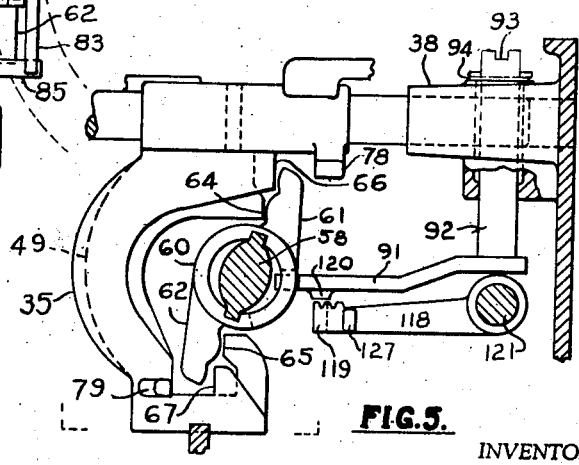
Fig. 5 is a side elevational view of the shift members and shifter in addition to the related selection finger, positioning the shifter, and of the lock lever, taken along the line 5—5 of Fig. 1.
Figure 6:
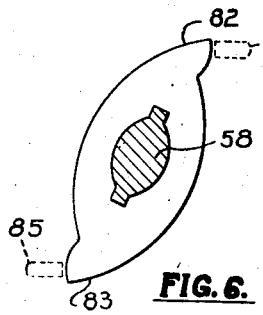
Fig. 6 is a left side view of the gear disengagement lever, appearing in Fig. 4, and identifiable by its characters, the rock shaft being in section.

Referring to Figs. 3, 4 and 5. Revolvably mounted in the bearing boss 54 formed integral with the transmission case 29, is the rock shaft 58, having the slide keys 59 and 59' formed integrally thereon to accommodate the transversely slidable shifter 60, provided with corresponding axial key-ways therefor, and having the upper arm 61 and the lower arm 62 relatively offset in different adjacent vertical planes, parallel with the slide rods 36 and 50. The rock shaft 58 is secured against axial dislodgment in the transmission case 29 by means of the external split ring 63. The shift member 49 has an integral downwardly projecting substantially C-shaped arm carrying the vertical contact surfaces 64 and 65 in the same vertical plane longitudinal of the slide rods 36 and 50 and adapted to be in the path of and to be selectively contacted by either of the arms 61 and 62 respectively of the aforesaid shifter 60. In the position shown by the full lines in Fig. 4, the upper arm 61 is in planar alignment with and in the path of the surface 64; accordingly, with the rocking of the rock shaft 58 in a counter-clockwise direction, (Figs. 3 and 5) the said arm 61 will forcibly move the said shift member 49 forward thereby effecting high driving ratio, through the agency of said surface 64 being forcibly abutted against and moved by the aforesaid arm 61. If, however, the said sliding shifter 60 were selectively transversely moved one position leftward of the shown full line position of Fig. 4, its lower arm 62 would be in the path of and contact the aforesaid surface 65 of the shift member 49, with the result that upon the rock shaft 58 being rocked in the same counter-clockwise direction, it would forcibly move the shift member 49 rearwardly to effect the intermediate driving ratio. During either of such operations it is obvious that one of the two arms 61 and 62 is clear of the shift member 49 or its contacting surfaces 64 and 65, due to the above mentioned offsetting in diverse planes of the two lever arms 61 and 62. Thus it is apparent that with the same directional rocking of the shaft 58, the shift member 49 is movable into either of its two opposite directions from its mid-position shown in Figs. 1 and 5.

Similarly for the low-reverse shift member 35, which has likewise a downwardly depending generally C-shaped arm carrying the vertical surfaces 66 and 67 positoned in the path of and engageable by the arms 61 or 62 respectively of the shifter 60, when said shifter is selectively slidably moved into the suitable position therefor along the keys 59 and 59' of the rock shaft 58.

However, in order to provide an additional neutral driving position the shift member 35 is offsetly bent so that its vertical contacting surfaces 66 and 67 are in different adjacent vertical planes. Accordingly, if the shifter 60 is moved leftwardly from the position shown in Fig. 4, so that the upper arm 61 lies in the same vertical plane as the contacting surface 66, the counter-clockwise rocking of the shaft 58 will move the shift member 35 forwardly into a low driving ratio position. However, if the said shifter 60 were moved one step farther leftwardly so that its upper arm 61 coincides with the plane immediately left of the contact surface 66, it will be found that its lower arm 62 would be positioned adjacently to the right of the contacting surface 67 of the shift member 35; namely, neither of the said arms will align with either of the contacting surfaces 66 or 67. Accordingly, a counter-clockwise rotation of the shaft 58 will not move the shift member 35, but instead its arms will move fully free thereof, which would correspond to a ratio change to neutral driving position with all gears remaining disengaged, though the ratio change movements of the other members such as that of the rock shaft 58 have been identical to such as required for a positive ratio change. But if the said shifter 60 were moved one farther position leftward on the rock shaft 58, its lower arm 62 will be in registering alignment with the contacting surface 67 of the shifter 35, so that a counter-clockwise rocking of the shaft 58 will cause the arm 62 to force the said shift member 35 rearwardly, thereby effecting the reverse gear engagement. Accordingly, it becomes evident that the five driving positions of the reverse, neutral, low, intermediate and high are selected and determined by the slidable positioning of the shifter 60 along the keys 59 and 59' of the rock shaft 58 in the consecutive order mentioned from the leftmost position on the said shaft to its rightmost position shown in Fig. 5.

I will later describe the agencies provided for sliding the shifter 60 into different selective positions on the rock shaft 58.

Now I will describe the agencies for actuating or rocking the shaft 58, which is accomplished by vacuum power supplied from the engine manifold of the automobile. Referring to Fig. 3, the cam member 69 has formed in the periphery of its central orifice two key-ways to snugly fit onto the two keys 59 and 59' of the rock shaft 58, and it is retained against dislocation by the annular flat disc 70 riveted thereon, which disc abuts against the left edges of the said keys 59 and 59'. Rotation of the said cam 69 effects similar rotation or rocking motion of the rock shaft 58. The throat 71 is formed in said cam to accommodate the arcuately contoured end 72 of the actuating lever 73 formed integral with its shaft 74 projecting through the bearing boss 75 (Fig. 4), in the wall of the transmission case 29, to which shaft is fixedly pinned the external power lever 76, to the lower end of which the vacuum diaphragm motor is connected, as will later be described, so that the clockwise rotation of the said shaft 74, as actuated by the spring 87, upon release of the vacuum power actuation, forces the lever end 72 downwardly against the surface 77 of the cam 69, thus rotating the said cam and the shaft 58 in an anti-clockwise direction. When, however, the shaft 74 is revolved anti-clockwisely by means of the attached vacuum diaphragm motor, it would rotate the said cam 69 in a clockwise direction until the said cam member assumes a position shown in Fig. 3, which corresponds to the gear disengagement position of the gear sets in the transmission system, as shown in the drawings.

In order to return the shift member 35 to its shown mid-position (Fig. 3), there are provided the integral lugs 78 and 79 formed on the shift member 35. Coacting with said lugs are the extending arms on the cam 69 providing the surfaces 80 and 81 respectively, so that the clockwise rotation of the said cam 69 with its attached rock shaft 58, will forcibly return the shift member 35 to the shown mid-position by direct contact of either of the said surfaces 80 and 81 with the lugs 78 and 79 respectively, according to the prior shift position of the shift member 35. This disengagement means is preferably provided primarily to assure that the arms 61 and 62 of the shifter 60 remain clear and unobstructed in their transversely slidable positioning on the rock shaft 58. A similar gear disengagement member is provided with the arms 82 and 83 fixedly mounted to the right end (Fig. 4) of the rock shaft 58, which arms are adapted to abut against the laterally extending lugs 84 and 85 respectively formed integrally on the shift member 49, so that the clockwise rotation of the rock shaft 58 (Fig. 3) will similarly assure that the shift member 49 be brought fully to its gear disengagement position to permit the shifter arms 61 and 62 to have free unobstructed movement on the rock shaft 58.

It will be observed that the shifter arms 61 and 62 contact the shifting surfaces 64 and 65 of the shift member 49 at a shorter radius or lever arm length than they do the surfaces 66 and 67 on the shift member 35. This is because of the fact that the shifting movement of the intermediate-high dog clutch member 42 is shorter than that of the low-reverse gear 33. It will also be observed (Fig. 5) that the shifter arm 62 in its full gear disengagement position, is farther distanced away from the surface 67 than from the surface 66 of the shift member 35, for the reason that the reverse gear ratio movement of gear 33 is shorter than its low driving ratio shift movement. I thus indicate two optional expedients for effecting differential shifting movements.

The automatic ratio determination mechanism

The shifter 60 (Figs. 4 and 5) has formed on its cylindrical portion the elongated slot 90 to accommodate the end of the selection finger 91 formed integral on the rotatable vertical shaft 92 projecting upwards through the boss 38, onto which it is bearinged, midway between the two bores for the rods 36 and 50, and having at its upper end the transverse slot 93. A washer 94 held by a cotter pin sustains said shaft 92 in its shown position.

The function of the determination mechanism is to slidably set the shifter 60 on the shaft 58 through the intermediacy of the lever 91 for determination of the subsequent ratio to be engaged by the above-mentioned shifting mechanism. This selection mechanism is of the so-called alternating type, namely, it automatically alternates the determination of the intermediate and the high ratios and also automatically alternates between the neutral and the low ratio positions. For example, if the prior driving ratio has been of the intermediate speed, a repetition of the same control operation on the part of the operator will accomplish high gear as the subsequent ratio; and upon the next identical operation by the driver, intermediate ratio will be effected, then high, then intermediate, and so on alternatively. The selection mechanism determines such subsequent alternations. So also in respect to the neutral and the low driving ratio positions. However, the automobile operator selectively determines which of these two sets of alternations are to become operative, by tilted position of the pedal foot plate. The automatic determination mechanism also assures that the low gear ratio follows only subsequently to the immediately prior neutral position, and that the high gear ratio immediately follows only subsequently to the immediately prior intermediate ratio position.

The automatic determination mechanism is actuated by the energy stored in the spring 95, the rear end of which is fixedly mounted in the transmission case 29 and the forward end of which is hooked into the actuating lever 96, which in turn is movably mounted on the bearing pin 97 fixed in the wall of the transmission case 29. Said actuating lever 96 has a lower substantially horizontally extending arm 98 in planar alignment with the cam member 69, and arranged for abutment cam wiping engagement by the arm 99 of the cam member 69. Upon counter-clockwise rotation of the said cam member, the said arm 99 will force the lever 98 downwardly so that the upstanding arm 96 thereof will assume its leftwardmost position, which when the car is normally driven, is slightly more leftward than is illustrated in Fig. 3. When the cam member 69 is rotated clockwisely, namely, in the full gear disengagement position, its said arm 99 releases the lever arm 98, thereby permitting the energy stored in the contractilely tensioned spring 95 to tend forcibly to move the lever arm 96 rearwardly, and thus energizes the actuation of the automatic selection mechanism.

Reference is now made to Figs. 7 to 13 inclusive. The lever arm 100, the end of which is operatively abutted against by the upper extremity of the aforesaid lever 96 (Fig. 3), is formed integral with the hollowed bearing boss 101, vertically projecting through and bearing on the transmission case cover plate 102 and is fixedly riveted onto the flat step lever 103, disposed parallel above the said cover plate. Said boss 101 is bored vertically to accommodate for relative rotation the upper end of the selection finger shaft 92, the key slot 93 of which registers with a key built in the short stub shaft 104 (Fig. 12) which, in turn, protrudes through a bearing hole in the upper surface of the cupped enclosure 105 enclosing the automatic selector mechanism. The purpose of this grooved key connection between the shaft 92 and the stub shaft 104, is to facilitate assembling in case the cover plate and the automatic selector mechanism is removed as a unit to uncover the transmission case.

Figure 7:
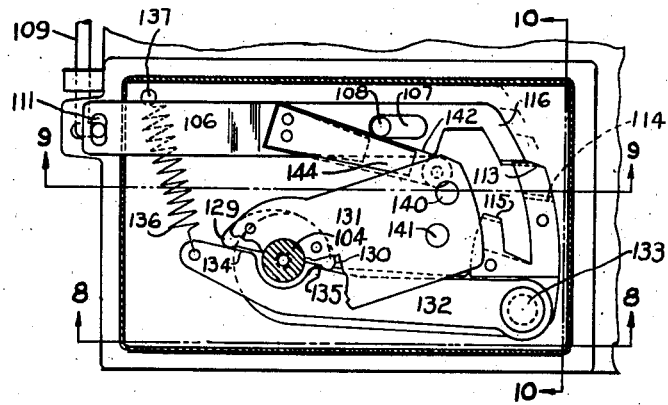
Fig. 7 is a plan view of the automatic selection or ratio determining mechanism, mounted on top of the cover of the transmission case, but with the top of its enclosing case removed.

The selection of the subsequent ratio and accordingly of the subsequent position of the finger lever 91 is determined by the position of the said stub shaft 104. This in turn is determined by a thin light weight check bar 106, having an elongated longitudinal slot 107 to encompass the stud 106 firmly affixed to and upstanding from the cover plate 102. The left extremity of the said check bar 106 protrudes through a corresponding rectangular horizontal guide slot cut in the lateral side of the cupped enclosure 105, so as to permit longitudinal positional setting thereof by the upstanding arm 109' of the rod 109, which is pivoted in the lug 110 integral with the transmission case 29, and which arm extends upwardly into the transverse slot 111 cut into the leftmost extremity of said bar 106. The said rod 109 leads forward for operative connection with the tiltable foot pad of the control pedal which is operated by the driver of the vehicle, to give corresponding lateral positioning motion to the check bar 106 in either of its two extreme positions. In Fig. 7 the check bar is shown in its rightwardmost position; and in Fig. 13 in its leftwardmost position. As a guide and stop for the lateral motion of the bar 106, I provide an extending flange ear 112, integral with the enclosure 105, which flange has a laterally extending elongated slot encompassing the rod 109' completely. One purpose of such external checking is to remove all strains and influences of the rod 109 on the check bar 106, which is to be lightly movable for its upper and lower level positioning. Besides the above mentioned longitudinal right and left positions of said check bar 106, its right extremity also assumes two vertical positions, an upper and a lower, which are automatically given to it by means determined by the prior setting of the shifter 60, and accordingly of the stub shaft 104 as a unit therewith, as will later be explained.

The purpose and function of the resultant four positions of the right extremity of the check bar 106, namely, two upper positions, one left and one right, and two lower positions, likewise one left and one right, is to check and stop the forward movement of the step lever 103 at definite equidistant position points, resulting accordingly in the definite positions of the selector finger 91, after a temporary movement discrepancy as will later become apparent. This is accomplished by providing at such several stop points, interference abutment steps formed on the rightmost arcuated sector of the step lever 103 and consisting of the high speed step 113, of the intermediate ratio step 114 and of the low ratio step 115. The step 114 is in the horizontal plane and integral with the main portion of the flat step lever 103, whereas the steps 113 and 115 are supplied by the separate stamped flat member riveted as an additional plate onto the upper surface of the said lever 103. Accordingly, the high and the low ratio steps 113 and 115, are at the higher level and the intermediate ratio step 114 is at the lower level. The rightmost extremity of the check bar 106 is formed with a contact or abutting extention 116, having an angular V male contact nose to register with corresponding angular V-grooves formed in each of the ends of the aforesaid step abutments 113, 114 and 115. Said V-grooves serve to restrain the check bar 106 from vertical respositioning while the said step abutments bear against the check bar. Obviously under certain conditions, the body of the step lever 103, when intervening would itself impede the check bar 106 from repositioning itself, temporarily.

Such rightmost extremity of the check bar 106 accordingly is adapted to engage or abut against any of the above mentioned three steps on the step lever 103, according to whether said extreme right end of the bar 106 is positioned at the upper level or the lower level, and also according to whether it is positioned longitudinally to the right or to the left. When it is positioned to the right and in its upper level, it will be in alignment with and in the path of the high ratio step 113 for motion checking abutment thereagainst. If it is in the right lowermost position, it will align with and abut against the step 114 corresponding to the intermediate driving ratio position, so as to check further forward motion of step lever 103 beyond such position. If it is leftmost in its upper level, it will align with the step 115, permitting the step lever 103 to move just that far forward for determination of the low driving ratio selection. If the extremity 116 of the check bar 106 is at the left and at the lower level, none of the above-mentioned steps are in alignment with it and the step lever 103 becomes accordingly free and unobstructed to continue to move forward until its extremity at 113 contacts the front wall of the enclosure cover 105. This is equivalent to the neutral ratio position of the shifter 60, and has the same effect as though an additional step were provided on the step lever 103 for corresponding contact or abutment with the check bar 106, for such neutral. Accordingly the step lever 103 can attain any of the four positions rotatively as above indicated.

I will now describe how the aforesaid selector finger 91 will follow and coincide with the positions assumed by the step lever 103, as above explained. In order to retain the selector finger 91 into a selective position, during the actual gear-shifting movement, I provide a lock lever 118 (Figs. 1, 3 and 5) having the toothed arcuated portion 119 registering with the lug 120 formed integrally with the selector lever 91, which lug is adapted to socket into any of the five lock teeth formed in the said arcuated portion 119. This lock lever formed integral with the shaft 121 projects through the bearing lug 122 on the wall of the transmission case 29, and is retained therein by means of the initially tensioned spring wire 123, one end of which projects through the end of the said shaft 121, the other end of which wire is fixedly retained by the lug 124 formed integral with the transmission case. Said spring wire tends to retain the arcuated end of the lock lever 118 constantly upward for effective locking. To release the lock, namely, to effect disengagement of the teeth in the portion 119 from the lug 120, there is provided an arm 126 on the cam member 69 (Fig. 3), which is adapted to press downwardly against the lug 127 projecting laterally and integrally from the said lock lever 118. Accordingly, when the cam member 69 assumes its full clockwise position, as shown in Fig. 3, the said arm 126 has already forced the lock lever in the release position as illustrated in Fig. 5. Due to the fact that this lock lever secures the selector finger 91 against movement during the initial time in which the aforesaid step lever 103, as comovable with the lever 96, has moved to a new position, it becomes necessary to provide a temporary compensating yield mechanism therebetween, which yield mechanism is of a nature to tend to move the stub shaft 104, and therefore also finger 91, into constantly definite relation with the step lever 103, after the release of said selector finger 91 and accordingly of the stub shaft 104 from the lock lever 118.

For the above purpose, integral with the said stub shaft 104, I provide two diametrically opposed arms 129 and 130, placed horizontally and adjacently between the step lever 103 and the setting plate 131, riveted firmly onto the aforesaid arms accordingly moving as one with the stub shaft 104 and with the selector finger 91 I provide the intermediate compensating yield lever 132 movably pivoted on the step lever 103 by means of a vertical bearing pin 133, and having two functional surfaces, 134 to abut against the arm 129, and the surface 135 to abut against the arm 130. A semi-circular section is cut away from the said lever 132 to avoid the main shaft section of the stub shaft 104. At the extreme left end of the lever 132 is a punched hole to accommodate one end of an initially tensioned contractile spring 136, fixed at its forward end to the pin 137 mounted fixedly on the cover plate 102. The tendency of this spring is constantly to pull the left end of the lever 132 forward, and to force the surfaces 134 and 135 into abutment with the arms 129 and 130 respectively. This spring accordingly tends to bring the selector finger 91 into certain definite normal unison relation with the step lever 103, but will actually temporarily permit discrepancy in such relation. An example of such discrepancy is illustrated in Fig. 13, wherein the arm 130 is distanced away from the contact surface 135. Any discrepancy of position in the other direction from that shown in Fig. 13, is likewise yieldably and temporarily compensated for, in which case the arm 130 would remain in contact with the surface 135, whereas the arm 129 would be advanced away from contact with its coacting surface 134. But as soon as the selector finger 91 is released by the lock lever 118 the pressure of the spring 136 upon the arm 129 would rotate the stub shaft 104 and the said finger 91 clockwise until the arm 130 will contact the surface 135 of the compensating lever 132. Furthermore, the spring 136 tends to hold the respective members in such contact relation with considerable initial tension and with accurate positioning. The said spring 136 has the function also to revolve the step lever 103 clockwise on its pivot in the cover plate 102, upon release of the actuation force exerted by the lever 96 against the lever 100. The effectual force moment of the spring 95, of course, predominates over that of the spring 136.

I will now describe the means by which the immediately prior position of the shifter 60 and accordingly of the selection finger 91 will automatically position the end 116 of the check bar 106 in its upper or lower levels; it having already been indicated and will later be described how the rod 109 is influenced by the tilting of the foot plate of the control pedal by the operator, to move such check bar either to the right or to the left positions. The above-mentioned setting plate 131 affixed to the stub shaft 104 and therefore constantly comovable in unison with finger 91, has stamped therein two perforations 140 and 141. The check bar 106 has affixed thereto a blade spring 142 having its floating end at its right extremity to which end is firmly mounted the conical registering button 143 with the cone point directed upward, which cone accordingly can be positioned vertically in respect to the check bar 106. To limit the amount of upward movement relative to check bar 106, and for definite positioning, however, of the said conical button and to give stored upward tensioning thereto, I provide a rigid check plate 144 also riveted with the same rivets that hold the blade spring onto the check bar 106. On the lower surface of the said check bar 106, I provide a comparatively light-tensioned blade spring 145 riveted similarly onto the check bar 106 by the same rivets holding the aforesaid members. The right extremity of the said blade spring 145 contacts and rides freely upon the upper surface of the transmission cover plate 102. Accordingly, its tendency is to raise and hold the end 116 of the check bar 106 constantly upward. However the blade spring 142 is of predominant tension, so that it tends constantly to press against its checking plate 144, versus the influence of the blade spring 145. I will show that the vertical position of the conical button 143 will determine the vertical position of the check bar end 116 when said check bar becomes free to move.

The vertical position of the button 143 will be determined according to whether or not it coincides with and at the same time actually rises vertically and partly into one of the aforesaid perforations 140 or 141 of the setting plate 131, as energized by the light tension blade spring 145 (see Fig. 11). The perforation 140 is in the path of the said conical button in respect to the rotation of the stub shaft 104 and plate 131, when the check bar 106 is in its rightmost position. The other perforation 141 is in the path of the said conical button when the check bar is in its leftwardmost position, as indicated in Fig. 13. Furthermore, the perforation 140 will coincide with the conical button when the selector finger 91 and the shifter 60 is in the intermediate ratio selection position and when at the same time the check bar 106 is in its rightmost position. Also similarly the perforation 141 will coincide with the conical button when the selector finger 91 and the shifter 60 are in the selected neutral driving position and when at the same time the check bar 106 is in its leftwardmost position.

When the conical button 143 is thus in position to coincide with the respective perforations, it will rise upward therein and tend to carry the end 116 of the check bar 106 up with it when the check bar is unimpeded in respect to such movement, by the step lever 103, thereby positioning such check bar in its upper level. As a result only when the selector finger 91 is in intermediate or neutral selected positions, will the end 116 of the check bar rise to its upper level position, in which position it is adapted to contact and check the respectively high and low ratio steps 113 or 115 when the step lever 103 is subsequently forced forward to effect such abutting contact thereby determining the high and the low ratios respectively. When the button 143 does not coincide with either of the said aforesaid perforations in the setting plate 131 it must ride along the lower surface thereof, thereby tending to give the lower level position to the end 116 of the said check bar 106. The aforesaid light spring 145 supplies this tendency to press and hold the conical button against the lower surface of the setting plate or to press it into one of the aforesaid perforations, if it coincides therewith.

Figure 8:
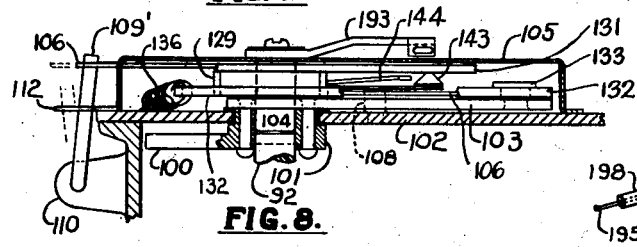
Fig. 8 is a rear elevational view of the same automatic selection mechanism taken along the line 8—8 of Fig. 7, but with the enclosing case top and the external lever added, and with the lever 132 partly broken away.

The purpose of the blade spring 142 is to permit temporary displacement relatively and vertically between the conical button 143 and the end 116 of the check bar, as is made necessary by the fact that the shifter 60 and its connected setting plate 131 move only after the step lever 103 co-moving with the lever 96 and hence with cam 69, has already assumed its new selective positioning, namely only after the said step lever 103 has completed its engagement with the check bar 106. Accordingly, if the button 143 is in its upper position in the perforation 140 and if the step lever 103 were moved forward, as energized by the spring 95, it will be found that the end 116 of the check bar will be in the path of and will accordingly contact the step 113 which determines the high speed ratio. Such step lever rotation occurs gradually during the release of the lever arm 98 (Fig. 3) by the clockwise rotation of the cam member 69, during which rotation the lock lever 118 retains the shifter in the prior selection position. Immediately thereafter, the said lock lever will release the selector finger 91 and permit the setting plate 131 to move into its new position corresponding to such high ratio, namely, into a position of normal contact relation with the step lever 103. However, during this movement the conical button 143 is forced out of the perforation 140 on its conical incline, whereas the end 116 of the check bar still remains in its upper level, held by the angular retention grooves milled into the step ends of the step lever 103, particularly in this instance by the groove in step 113. Hence, the blade spring 142 must temporarily yield to permit such temporary displacement. Such positions are shown in Figs. 7 and 8. However, when the step lever 103 is moved rearwardly by reason of the cam member 69 forcing the lever arm 98 (Fig. 3) downwardly, upon gear engagement motion of the aforesaid rock shaft 58, the end 116 of the check bar will be released from the said angular retaining grooves with the result that the said end 116 will be forced to its lower level position, due to the stored tension in the said blade spring 142. Such position is indicated in Fig. 9.

Accordingly, tracing a complete cycle of alternations: During gear engagement, the step lever 103 is forced rearwards (downwards, viewing Fig. 7), thereby releasing the bar 116 to seek its low position shown in Fig. 9. During the subsequent gear disengagement, the step lever 103 is forced forwards until its step 114 engages the bar 116. At the end of this gear disengagement movement the lock lever 118 releases the plate 131, permitting said plate to follow the step lever, positioning the finger 91 into its intermediate ratio position. During the subsequent intermediate gear engagement movement the step lever 103 is forced rearwards, thus freeing the bar 116, permitting the button 143 to rise into the perforation 140, thereby positioning the bar 116 into its upper position. During the subsequent gear disengagement the step lever 103 is forced forwards until the step 113 engages the bar 116. At the end of this gear disengagement movement, the plate 131 becomes free to follow the step lever, thus positioning finger 91 into its high gear ratio position. During this movement of the plate 131, the button 143 is forced out of the perforation 140, to assume the position shown in Figs. 7 and 8. The step lever 103 always completes its engagement with the bar 116 before the plate 131 becomes released by lock lever 118.

It becomes evident that if any prior setting of the selector finger 91 and subsequent shifting has taken place, as determined by the rightmost position of the check bar 106, and that if thereupon the said check bar is moved by reason of the drivers tilting of the control pedal plate, to its left position preparatory to the other cycle of automatic ratio selection, invariably the neutral ratio position, namely, the position which corresponds with the nose at 113 of the step lever 103 contacting the front wall of the enclosure 105, will be determined as the next ratio selection, because invariably under such conditions the conical button 143 will ride on the under surface of the setting plate 131, there being no perforation in the zone on plate 131 leftward of the perforation 140. This implies that the neutral ratio will invariably be determined prior to that of the low driving ratio, which is one feature of this mechanism and which responds properly to traffic conditions. Likewise, if the selector finger were already in neutral position or low position due to the check bar 106 having been effectually in its leftmost position, and if thereupon the check bar were moved to its rightmost position by tilting of the foot plate on the control pedal, the intermediate ratio which corresponds to the step 114 will invariably be determined, due similarly to the fact that the button 143 will ride on the lower surface of the setting plate 131, there being no perforation in the zone of plate 131 directly to the right of the perforation 141, implying that the intermediate ratio will invariably be determined before the high speed ratio. However, as will appear more clearly later, the automobile clutch need not necessarily be reengaged after each shift change. Accordingly, if driving in high speed ratio were desired immediately after a neutral or low position driving, the intermediate ratio may become fully engaged, by mere short stroke pedal reciprocation in the lowermost gear-shifting range of pedal stroke, but without clutch reengagement, and immediately thereafter by repetition of such pedal reciprocation high speed ratio may be engaged followed by subsequent clutch reengagement for effectual high speed driving.

Since the check bar 106 must be free from interference with the step lever 103 in its positioning movements prior to the full or ratio change depression of the control pedal, the cam member 69 which stores actuation energy in the spring 95 for the determination mechanism, must slightly overthrow, in order to carry the lever 96 an over amount leftward of its effectual high ratio selective position indicated in Fig. 4, so that the step lever 103 is also carried rearwardly by an extra amount of movement, in order to clear interference with the check bar 106.

The transmission cover plate 102 separates the compartment of the automatic determining mechanism from that of the transmission case 29, thereby virtually preventing the heavy congealable lubricant of the transmission case from entering into said mechanism compartment, in which a lubricant grease of a different nature would be inserted so as not to cause any impedance in cold weather.

In actual operation, it was found that when, for instance, the check bar 106 is in abutment with the intermediate ratio step 114, with the control pedal fully depressed, forceful tilting of the foot-plate on the control pedal, namely, forceful movement of the check bar 106 leftward would cause determination of the neutral due to the quickness of the movement of the step lever 103. Furthermore, when the check bar 106 is in contact with the low ratio step 115, as is indicated in Fig. 13, and if thereupon the foot would forcefully tilt the foot plate so as to force the check bar 106 toward its right position, the end 116 of the said check bar would be forced away from the low ratio step, to the vacant space on the step lever shown immediately to the right of such low speed step. As a consequence the step lever 103 would move until its end at 113 would contact the enclosure front wall, thereby determining the neutral ratio position. This has practical application in traffic conditions, if considering that a gear tooth to tooth condition at times occurs when attempting to mesh the coarser low speed gear teeth. Accordingly, to correct such condition the foot would tilt the foot plate of the pedal in the opposite tilted direction thereby immediately attaining the neutral selected position which would permit the control pedal to return, to engage the clutch to spin the gears for a new attempt to shift into the low gear ratio.

*The declutching assister*

In order to permit a reduced foot work requirement, in terms of control pedal stroke, for the otherwise cumbersome clutch engagement function, I provide a clutch disengagement assister mechanism, employing the principle of storing the clutch spring energy for reuse, in place of the customary system of dissipating such energy and thereupon resupplying its equivalent through muscular exertion.

Reference is made chiefly to Figs. 16 and 17. Extending laterally from and integrally with the transmission case 29 is the bearing bracket 150 (Fig. 1), supporting the bearing pin 151 onto which is revolvably fulcrumed the effectually L-shaped lever 152 with anti-frictional needle bearing rollers as 153 therebetween. On the laterally extending arm 154 of said lever is anti-frictionally pivoted, also by means of needle bearing rollers, the yoke connection 155 carrying the stamped flat and offset formed connecting rod 156, the forward end of which is fixedly riveted to the reinforced rear wall of the cylindrical enclosure 157 encompassing and enclosing the compression spring 158, the front end of which bears against the plate 159 affixed to and moving with the said enclosure 157. The rear extremity of the said spring bears against the washer 160 affixed to the rear end of the yoke member 161 encompassing the clutch throw-out rod 162 which extends through an elongated orifice in the clutch housing, in order to connect with the customary axially movable clutch operating members enclosed in the clutch case 28, (Fig. 22) the particular throw-out rod arrangement disclosed being the type employed on recent Buick automobiles.

On the forwardly extending arm 163 of the lever 152 is anti-frictionally pivoted the yoke connection 164 communicating by means of the offset connecting link 165 and rod 166 to the energy storing spring 167, the rear end of which is attached to a part 168 of the automobile chassis frame considerably to the rear of the automobile. The said spring 167 is tensioned contractilely and consequently gives a constant rearward pull tension to the connecting link 165 and its pivotal yoke connection 164. In the position shown by the full lines in Fig. 16, it is apparent that such tension of the said spring 167 tends to rotate the lever 152 counter-clockwise on its pivot pin 151, accordingly tends to pull the clutch throw-out rod 162 rearwardly of the car, in the direction to disengage the clutch. Accordingly, whatever tension is thus supplied by the spring 167 contributes to the clutch disengagement.

With the clockwise rotation of the said lever 152 on its pivot pin 151, the effectual lever length which is defined by the distance from the said pivot point 151 perpendicular to the line of force passing through the connecting rod 166 gradually becomes shorter, and finally upon complete clutch reengagement this line of force has passed to the opposite side of the pivot pin 151, as is indicated by the dotted outline of Fig. 16. Accordingly when the clutch is in its fully reengaged position, the tension of the spring 167 supplies additional resistance to the foot operation of the control pedal, versus the customary "clutch-riding" evils.

For the driver actuation of the said lever 152, I provide an extension to the arm 154 into the end of which is rotatably pivoted the rear end of the connecting link 170, the forward end of which is pivoted to the lower extremity of the arm 171 (Fig. 22) depending integrally from the control pedal to be later described. The movement of the said arm extremity rearwardly, accordingly, moves the lever 152 counter-clockwisely on its pivotal bearing 151, which rearward movement corresponds with the depression movement of the control pedal.

It is desired, with a short movement of the control pedal, that a relatively longer movement thereof is assigned to care for the clutch plate pressure variability stage of the customary clutch operation for better control of the clutch engagement. The encased spring 158 (Fig. 17) serves this purpose. Assuming the clutch to be engaged, the depression of the control pedal rotates the lever 152 counter-clockwisely, thereby forcing the connection rod 156 rearwardly. Because of the heavy tension of the customary clutch springs, the initial effect of such rotation of the lever would compress the aforesaid spring 158; and only after the tension of the said spring virtually equals the tension of the customary clutch springs will the clutch throw-out rod 162 be moved rearward with a substantial amount of movement which would advance the clutch plates away from each other, as is required for full completion and non-drag. However, when the tensioning is gradually transferred to the said compression spring 158, the pressure between the clutch plates is correspondingly gradually reduced. In inverse order, namely, upon the clutch reengagement stroke of the control pedal, the clockwise rotation of the lever 152 permits the throw-out rod 162 to move a substantial distance until the clutch plates begin to pressure engage, thereafter the compression spring 158 will gradually distend with decreased tensioning and with correspondingly increased pressure between the clutch plates.

Control pedal resistance graduation, constancy or variation, as desired, can be effected by giving consideration to the relative tensions and to variations of spring tensions as affected by amplitude of movements of the springs 158 and 167, and relative to the leverages and leverage variations. For example, with all other factors and dimensions remaining constant, if the spring 158 were given an increased number of coils, the final portion of the control pedal depression would offer less resistance to the foot. As a further example, if all other factors and dimensions remain unchanged, if the line of spring force through the connecting rod 166 were permitted to move still farther to the right of the pivot center of the pin 151, so as to effect an increased degree of clutch disengagement at the moment when such line of force passes to the left side of the pivot center of the pin 151, an increased resistance of the control pedal against the foot would result for the major function of the clutch disengagement stroke of the pedal. So also, by changing the tension or the effectual length of the spring 167, different pedal resistance and graduation of resistance can be effected. It is optional to provide initial tensioning condition for the spring 158, to decrease the total pedal throw.

The variation in the tension of the customary clutch springs by their gradually increased compression upon clutch disengagement movement, is also to be brought into consideration relative to the other variable tension factors in the system.

The operative friction losses must naturally be compensated for and be supplied by muscular effort, for which reason I provide the anti-frictional needle bearing structures disclosed. The purposes of reduced foot-work are enhanced by the choice of clutch structures which proffer anti-frictional operation. Results can and have been obtained, of light-pressured short-stroked pedal operation, with a fairly constant pedal resistance for the full declutching stroke, and also for variations in resistances, as might optionally be desired.

The customary clutch pedal clearance, or free motion, is provided for the normal clutch engaged position of the control pedal. However, to avoid a continuation of the gradual increase of pedal resistance as the pedal reaches its fully released or fully returned position, I provide the integral stop lug 173 projecting from the bearing boss portion of the lever 152, for engaging and checking the further rightward movement of the rear end of the offset link 165, notwithstanding further anti-clockwise rotation of the lever 152.

The horizontal lever arm 174 extending rightwardly from the lever 152, has at its extremity a horizontally disposed eye or closed loop encompassing the front bent extremity of a vacuum valve operating link, for the vacuum diaphragmed shifting motor to be later described. This structure provides a lost-motion connection so that such valve becomes operative for vacuum charge at the very final portion of the anticlockwise rotation of the lever 152. The automobile driver can feel the additional resistance incident to the operation of such a valve, to indicate the point in the pedal depression stroke where the mere declutching function has been accomplished, if a new ratio change is not desired.

An interlocking arrangement is provided, which prevents the clutch from becoming reengaged, before the shifting operation has been completed. As is disclosed in Figs. 16 and 17, the lower extremity of the power shift lever 76, obstructs the clockwise rotation from the disclosed position of the lever 152, except to the extent of an initial clockwise movement, sufficient to release the vacuum motor valve. Therefore, I provide the extended structure on the lever arm 163 for checking abutment against the said power lever 76, which in the drawings is shown in its gear-disengaged position. However, when the said lever 76 is moved forward for gear engagement, it will move out of the path of the lever arm 163, and permit its unobstructed clutch reengagement movement; until it contacts the lower recessed wall of the transmission case 29, or any suitable stop equivalent, which, incidentally, may be made adjustable, if desired. Furthermore, the shifting cannot be effected before clutch disengagement.

Referring to Fig. 22, the tensioned contractile spring 176 tends constantly to pull the clutch throw-out rod 162 forward, in a conventional manner and purpose; incidentally, it serves the purpose of maintaining the parts associated with the link 156 (Figs. 16 and 17) in taut condition.

The set screw 176 is threaded into the forward portion of the yoke member 161 and sockets into a vertically angular groove formed in the clutch throw-out 162, which groove secures the said adjusting screw against accidental rotation. The purpose of this adjusting screw is to serve as a take-up for the customary wear of the clutch plates.

The pedal control

Reference is made to Figs. 19, 20, 21 and 22. A solitary pedal is provided for controlling the shifting and the declutching operations. The initial and major portion of the depression of the pedal provides the purely declutching function; but the farther and final depression of about $\frac{1}{8}$" takes care of the shifting operation. Between these two stages the foot feels an added resistance, which is helpful in indicating that the foot should not press in the shifting operating stage unless it is so desired. This pedal's position in the automobile generally is in the customary location for the clutch pedal, but its pad is normally positioned closer to the floor board than is customary since its total stroke is approximately that of, or shorter than that of the usual accelerator pedal.

The control pedal 177 pivoted on the pin 178 affixed to the bracket 179, which in turn is fixedly riveted to the automobile frame designated by 27 (Fig. 22), has the forward extending arm 177' to the upper extremity of which is integrally formed the arcuated portion 180 passing through the floor board 181.

The two laterally opposite stop or rest arms 182 and 182' formed integrally on the sides of the said arcuated portion, serve to check the lateral tilting movement of the foot-pad 183, having the depending bearing ear 184 to accommodate the pivot pin 185, projecting through the long arm 186 integral with the foot-pad, the forward end of which arm registers in an orifice in the selector rock bar 187, pivoted at 188 to the pedal arm 177', for lateral pivotal motion in respect thereto.

The rear end of the said bar 187, connects with the forward upstanding arm 189 of the aforementioned automatic selector mechanism operating rod 109'. Due to the location of the said pivot pin 188, the tilting of the foot plate 183 (as shown) by predominant pressure of the foot to its right side will move the said upstanding arm 189 of the rod in its rightmost direction, which would move the check bar 106 of the automatic selector mechanism likewise rightwardly. Similarly, predominant foot pressure, or equivalent foot placement on the left side of the foot pad 183, moves the check bar 106 of the automatic selection mechanism to its leftmost position, for the neutral-low series of ratio selections. The foot surface of the said foot-pad 183 is somewhat arcuated (Fig. 21), to render foot tilting unnecessary, for ratio selections.

The bodily depression of the pedal initially effects the clutch disengagement by means of its long integral downwardly extending arm 171 (Fig. 22), connecting by means of the rod 170 to the clutch assister mechanism. Because of the relative movement due to engine vibrations between the engine unit and the automobile frame, as is usual in recent automobiles, such long lever arm length of the said arm 171, and consequently the longer throw of the effectual connection bridging between the engine unit and the frame, namely, of the rod 170, serves to diminish to a proportionate extent the undesired influences of the relative engine movements upon the control pedal and its train of clutch operating members.

The reverse ratio selection

Figure 14:
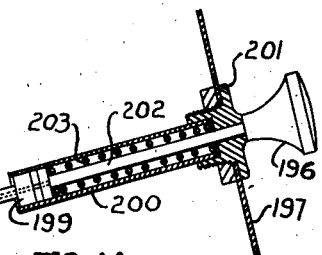
Fig. 14 is a sectional view of the manual reverse ratio pull-out, as affixed to the instrument panel of the automobile.

Referring to Figs. 8 and 13. The stub shaft 104 extends upwardly through the enclosing cover 105 of the selection determining mechanism and is affixed by means of a screw to the horizontal external lever 193, at the extremity of which is formed a downwardly bent ear, having a horizontal lost-motion orifice, through which passes the straight end of a cushioning spring 194, the outer end of which spring is looped to checkingly abut against the aforesaid ear. The continuation of the said spring forms the pull wire 195 leading forward to the manual pull-out knob 196 located on the instrument panel 197 of the automobile (Fig. 14). Said wire 195, passes through a tube 198 which is positionably fixed on the transmission cover 102 (Fig. 13) and has its forward end fixed to the bushing 199 affixed to the forward end of the tube 200 (Fig. 14), in turn firmly attached to the bushing 201 bolted on the said instrument panel. The aforesaid wire 195 passing through said tube, is firmly attached to the stem 202 of the manual knob 196. If this knob is pulled rearwardly it will tend to pull the lever 193 and the attached stub shaft 104 in a counterclockwise direction. Within the said casing and encompassing the aforesaid stem 202 is an initially tensioned compression spring 203 bearing against the flanged forward extremity of the said stem and having a tendency constantly to retain or urge the said stem and the connecting manual knob forwardly, and thereby to retain the wire 195 in its normal rearmost position in respect to the lever 193, which normally does not affect the said wire 195.

When the knob 196 is pulled rearwardly the stub shaft 104 is rotated counter-clockwise until the setting plate 131 contacts the front wall of the enclosure 105, as indicated in full lines in Fig. 13. This corresponds with the reverse ratio position. It will be observed that because of the abutment connection between the arms of the said stub shaft 104 and the compensating lever 132, that the said stub shaft is movable independently of the position of said compensating lever. To illustrate such condition, I show in Fig. 13, that the step lever 103 is checked at the low driving ratio selected position. This indicates that the operator has selected the low gear ratio by pedal operation, and then while holding the pedal depressed has decided to shift into the reverse gear, by forcefully pulling out the manual button 196 to rotate the stub shaft 104 and the setting plate 131, and thereby also to move the shifter 60 into the reverse position. The lever 193 is free to rotate on its pivot only if the lock lever 118 has released the selector finger 91; accordingly, only when the pedal is depressed. Under other conditions the cushioning spring 194 absorbs the manual reverse pull effort, to lighten the strains on the mechanism. The manual reverse knob is to be held out, until the foot has released the control pedal, so that the cam member 69 would permit the lock lever 118 to hold the selector finger 91; whereupon the hand may release said reverse manual pull-out. The cushioning spring 194 is heavily initially tensioned, so as to hold predominance over the automatic selection mechanism spring 136.

The driver may effect the reverse ratio at will, provided he depresses the control pedal, which controls the vacuum flow for the shifting function, independently of the status or positioning of the step lever 103, namely independently of the position of the foot-pad on the control pedal.

The synchronization actuation

As previously indicated, the synchronizing drum 51 (Fig. 1) is axially forcibly moved either forwardly from its mid-position for synchronizing of the high speed gears before actual gear engagement, or it is moved rearwardly from its mid-position for similar synchronization of the intermediate speed gears prior to the actual dog meshing of the teeth 41 with the internal dog mesh teeth 40. The synchronization function of the device is accordingly limited to the intermediate and high driving ratios. I will now describe the means provided for thus axially moving the synchronizing drum 51 into either of the said directions.

Figure 1:
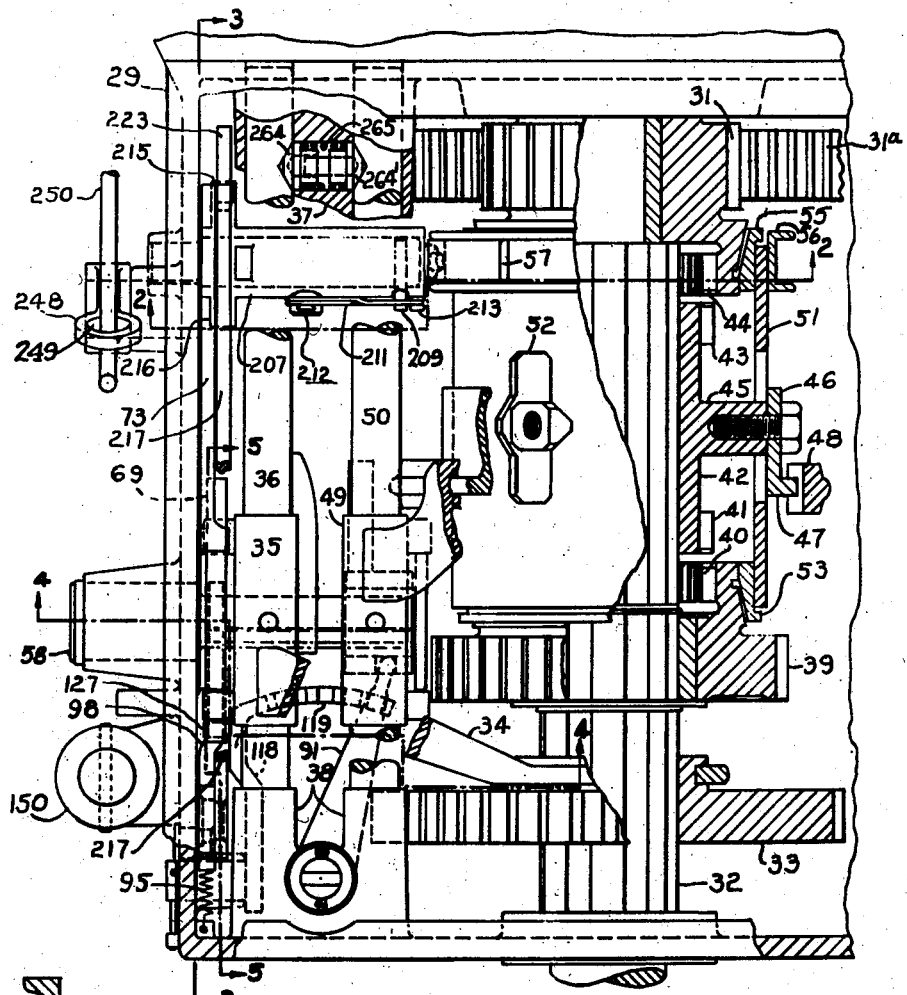
Fig. 1 is a plan view of the gears and the gear shifting mechanism enclosed in the transmission case, with some parts cut away and partly in section.
Figure 2:
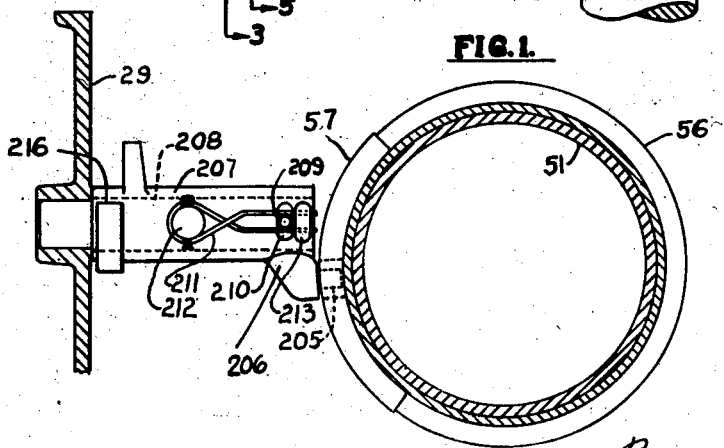
Fig. 2 is an elevational view from the rear of the synchronizing rock sleeve and associated synchronizer parts, taken along the line 2—2 of Fig. 1, the synchronizer drum and its operating shoe groove shown in section.

As previously indicated the anti-friction shoe 57 rides in the annular groove 56 (Fig. 1). In a suitable orifice in said shoe the finger 205 operatively projects, which finger is integral with the lever arm 206 formed integrally on the hollow rock sleeve 207 rotatedly mounted on the fixed stud 208 (Fig. 2) affixed to the wall of the transmission case 29. The pin 209, driven into the said stud shaft, retains the rock sleeve against axial dislodgement, by projecting through the peripherically disposed elongated slot 210 formed in said rock sleeve, in order to permit relative rocking motion of the said sleeve. It is apparent that the rotatable rocking motion of the said sleeve 207 in either rotatable direction from its normal center, presses through the intermediacy of the aforesaid friction shoe 57, the synchronizing drum 51 into its either forward or rearward direction. In order, however, to return and to retain the said finger 205 in its inoperative mid-position, I provide a tensioned centering spring 211 retained by looping around the boss 212, formed integral on the said rock sleeve; a cotter pin retaining the said spring against dislodgement. The flexible floating right ends of the said spring 211 abut and contact the sides of the fixed retaining pin 209, beyond which said spring ends project to contact on the substantially horizontal surfaces formed by vertical mill grooving the lug 213 formed integrally with the said rock sleeve. The said contact surfaces are substantially and horizontally in horizontal alignment with the respective upper and lower surfaces of the said pin 209; and the effect of the whole construction is to provide considerable initially stored tensioning so as to securely return and retain the synchronizing drum 51 in its inactive mid-position after the synchronizing function has been effected.

For rocking the said synchronizing sleeve 207, I provide integrally thereon the diametrically opposed arms 215 and 216 (Fig. 3). I also provide means to forcefully press downwardly on one or the other of the said arms, in order to rotatably rock the sleeve into either direction of the rotation. This is accomplished by means of a substantially flat synchronizing bar 217 mounted along the inner left wall of the transmission case 29, and pivoted at its rear end to the lever 96, which bar has a duality of downwardly projecting extensions 218 and 219 mutually distanced apart less than the distance between the ends of the two arms 215 and 216, so that in its positioning above the said arms, at least one of the said downward depending extensions would register above one of the said arms. However, for operative actuation it is provided that only one of the said extensions will engage either of the arms 215 or 216 while permitting the other arm to move unobstructedly and become positioned in the throat between the aforesaid two extensions 218 and 219. In order to thus force downward the left extremity of the synchronizing bar 217 I provide an arm 221 integral with the rock shaft 74 and with the actuating lever 73, onto which arm is an integral inwardly extending actuating lug 222 fitting in the throat formed between the projection 223 and the lower throat surface 224 of said synchronizing bar. The counter-clockwise rotation of the said shaft 74 accordingly exerts downward pressure upon the surface 224 by means of the lug 222, and thus in turn forces downwardly the forward end of the synchronizing bar 217 for rotation of the synchronizing rock sleeve 207.

The position shown in full outlines of Fig. 3 is that of high ratio selective setting of the said synchronizing bar 217, so that the further counter-clockwise rocking of the shaft 74 will press the arm 216 downwardly to rotate the rock sleeve in a clockwise direction for effectual synchronization of the high speed gears. However, if the said synchronizing bar were moved one position longitudinally rearward (rightward in Fig. 3) from that illustrated, the extension 218 will register with the left arm 215, so that upon counter-clockwise rotation of the shaft 74 such left arm will be forced downward to rotate the rock sleeve 207 counter-clockwisely for effectuating synchronization of the intermediate driving ratio gears. If said synchronizing bar 217 were moved still another position farther rearward, which would correspond with the low ratio gear selection and which is not to be synchronized in the device, the said bar will have moved sufficiently to the rear, so that the actuating lug 222 will not register with the surface 224 on the said bar, but will move unimpededly downward in the space immediately forward of the said surface 224, and hence will not affect bar 217 for synchronization.

Similar non-effect of the synchronization applies also when the said bar 217 is selectively positioned still another position rearward, which would correspond to the neutral ratio position. Accordingly, synchronization would be effective for only the intermediate and the high driving ratios. The purpose of the aforesaid forward extension 223 on the said bar 217 is to return the said bar upwardly into normal inoperative position by the clockwise rotation of shaft 74, so that said bar would be free to be positioned in any of the four longitudinal selective positions as indicated above. The said bar is accordingly positioned by the corresponding positioning of the lever arm 96, which is controlled by the checking abutments of the check bar 106 against the step lever 103 of the automatic determination mechanism as previously indicated. It will be noted, however, that the lever 96 will move rightwardly with the movement of the cam member 69 in said cam clockwise rotation. Accordingly, the synchronization selective setting of the said synchronizing bar 217 will take place during the gear disengagement operation of the cam member 69 and of the shifting mechanism attached thereto, thus providing a time element for the setting of the said synchronizing bar and its associated mechanism.

Vacuum Power Actuation

As previously indicated the power lever 76 is actuated positively in its counter-clockwise rotation on the shaft 74 by means of vacuum power supplied by the engine manifold of the automobile (Fig. 22). The connecting rod 226 connects the said power lever with a movable diaphragm disc 227 (Fig. 18) which is joined to the diaphragm case member 228 by means of the flexible rubber diaphragm 229 riveted by flanged members onto the said disc and on the said case, so as to hermetically enclose the chamber 230 of said case. It is designed that vacuum pressure within the said chamber pulls the said diaphragm disc inwardly as is conventional in devices of this type. The rod 226 is adjustably threaded into the stem 231 having the annular flange 232 integral therewith, against the surface of which bears one extremity of the tensioned compression spring 233, which has its other end bearing against the inverted bottom of the cup-like cylindrical enclosure 234 affixed by means of rivets to the said diaphragm disc 227. Said spring is initially tensioned with sufficient force so that during the total shifting operation the rod 226 and the said disc 227 will move in unison. However, the said spring serves for cushioning when the synchronizing drum 51 is in its ultimate effectual pressure synchronizing position and serves to administer a certain maximum tension to the said synchronizing drum for efficient synchronization without any over-strains and independently of the amount of vacuum pressure exertion in the said chamber 230 or the amount of wear of the synchronizing friction surfaces.

A substantially three-way valve controls the flow of vacuum into the aforesaid chamber 230, or alternatively gives communication between the said chamber and the outside atmosphere through suitable exhaust ports. Because of the similarity of actuation movements with motors of positive pressure such as employ compressed air, I use the terms "inlet" and "exhaust" just as though they apply to such positive pressure devices. The movable cylindrical valve member 236, is bored out to form substantially a cup to permit the mounting of the compression spring 237 therein, which spring bears against the wall of the aforesaid case 228 at one of its ends, its other end bearing against the valve member 236, with an initial tension to press said member away from the said casing wall for exhausting the vacuum from the motor. The said valve member is surrounded by the valve body 238 having the continuously annular inlet groove 239 formed in its inner periphery and communicating with the metal duct 239' leading to the engine manifold, and has a similar continuous annular exhaust groove 240 in its inner wall communicating through small ports to a compartment 241 filled with air filtering material. The valve member 236 has orifices, as 236', for communication between the chamber 230 and the inlet groove 239.

The length of the said valve member 236 in relation to the distance between the farthest edges of the aforesaid annular grooves is such that at least one of the grooves will be completely closed by the said valve member before even a part of the other groove or port is uncovered. The valve member accordingly covers or uncovers the inlet or the exhaust ports in a manner commonly employed in such valves. Consistently with the position of the mechanism generally as disclosed in the drawings, the position of the valve member as shown in Fig. 18 is that of the inlet port uncovered and the exhaust port closed, namely, whereby communication is established between the chamber 230 and the engine manifold.

For operative control of the said valve member 236, I provide a round pin 243 longitudinally slidable in a bore in the rear end of the valve body 238, and projecting therethrough for pressure contact by the operating lever 244 pivoted to a pin in the fulcrum bracket 245 riveted onto the rear wall of the case 228. The lower flat end of the said control lever has pivoted therein the connecting rod 246 leading forward to the lost motion control connection with the declutching assister arm 174, as indicated in Fig. 16. In the shown position the lever is held in its fully leftward, accordingly in the valve open, position.

However, upon return of the control pedal the clutch assister mechanism will rotate clockwisely, viewing Fig. 16, and will release its pull on the aforesaid connecting rod 246 and the lever 244. The initial portion of such movement would first cover the inlet groove 239 of the valve body, and immediately thereafter farther movement in the same rearward direction would uncover the exhaust groove 240, and thus effect communication between the chamber 230 and the outside atmosphere thereby permitting the diaphragm disc 227 to move forward as urged by the shift actuating spring 87, (Fig. 3) thus effecting first the synchronizer release, and immediately thereafter effecting the newly selected gear engagement.

Accessory devices

For emergency shift operation by muscular effort of the driver, in the infrequent event that the vacuum power should fail, I provide integral and upstanding from the power lever 76, the lever arm 248 (Figs. 4 and 22), having at its upper extremity the lost-motion eye 249, encompassing the connecting rod 250, having its rear end bent for pressure engagement with the said arm 248, and leading forward for pivoting on the lower extremity of the lever 251, pivoted on the bracket 252, fixed onto the engine.

The upper extremity of the said lever has the connecting rod 253 pivoted thereon, which leads rearward through the guiding tube 254 attached to the automobile dash board 255, and terminates in a looped hand grip 257, suitably socketing in the end of the said guide tube. The spring 258 attached between a fixed point and the said lever 251 tends constantly to retain the said grip into socketed engagement with the said tube. Forceful manual pull by the driver upon the said hand grip rearwardly, tends to rotate the lever arm 248 and the lever 76 in a counter-clockwise direction, and thus substitutes for the like vacuum power actuation of the said lever. For effecting such manual emergency operation it is required that the control pedal be depressed, to disengage the automobile clutch, and thus to provide a clear path for the operation of the said lever, in respect to the declutching assister mechanism interlocking arrangement previously described.

Figure 15:
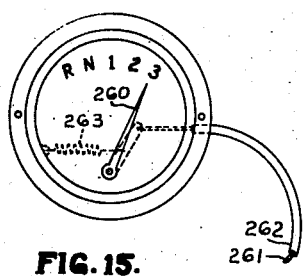
Fig. 15 is the face view of the indicator located on the instrument panel of the automobile.

A ratio selection indicator is also provided in the form disclosed in Fig. 15, and mountable on the instrument panel of the automobile. It has the indicating finger 260 pointing to ratio indications in natural order. To a lever arm firm with said finger within the enclosure of the indicator shell, is attached the end of the thin bronze pull-wire 261, riding in the communicating duct 262 for connection with the lever 193 (Figs. 8 and 13), which lever moves in unison with the selector finger 91, and hence is indicative of the selected positioning of the shift mechanism. The spring 263, within the enclosure of the indicator (Fig. 15) is contractilely tensioned and has the function and purpose of retaining the wire 261 in taut and properly registering condition.

Referring to Fig. 1, an interlock arrangement is provided for the sliding shift rods 36 and 50, as is customary in transmission devices, consisting of the twin members 264 and 264' circularly lathed and of truncated conical sliding surfaces for registration with an angularly machined notch milled in each of the said slide rods 36 and 50, and mounted in a bore in the boss 37 integral with the transmission case 29. When the said two notches are in mutual transverse alignment and in registration with the members 264 and 264', the gears of the transmission are all in disengagement position. An extensilely tensioned compression spring 265 bears against annular integral flanges on the said members, to urge them apart. A small guiding pin slides in bores in both of said members, to keep them in proper axial position in the boss bore 37. The combined overall length of the said twin members exceeds that of the width between the sliding bars 36 and 50, so that only one of the said slide rods is permitted to move from its mid-position at one time. The chief purpose of the spring urging the said twin members apart, is to retain the slide rods and their associated shift members and gear yokes in gear disengaged position, particularly for the neutral ratio condition, to prevent accidental gear engagement.

The general operation

In the shown full-line positions (except views 9, 11 and 13), the car driver, in the act of making a shift change from intermediate to high driving ratios, is assumed to be holding the pedal 177 fully depressed with predominant foot pressure on the right side of the tilted foot plate (as viewed from the driver's seat), the said plate thus contacting surface 182 (Fig. 21). The automatic ratio determination mechanism has already preconditioned the shifter 60 (Fig. 4) for high ratio; and the synchronizer bar 217 (Fig. 3) is already preset for high ratio synchronization.

However said positions of the drawings assume the power actuation movement arrested in the gear-disengagement direction, though the gears are already fully disengaged with the lock lever 118 clear of the finger 91 (Figs. 3 and 5). We'll now proceed from there on. Continued power suction pull continues to rock shaft 74 (Fig. 3) counterclockwise, thereby forcing the forward end of the synchronizer bar 217 downward, thus revolving sleeve 207 clockwise forcing the drum 51 (Fig. 1) forward to actually synchronize the high gear set; the whole operation being quick.

Thereupon the car driver permits the pedal to retract, thereby revolving the clutch-operating lever 152 (Fig. 16) clockwise in the clutch engagement direction, the initial revolution of said lever operating the vacuum valve to cut communication with the engine manifold and to vent the vacuum motor 228 to the atmosphere, thereby permitting the strong actuating spring 87 (Fig. 3) to revolve the shaft 74 clockwise, revolving the shift cam 69 counterclockwise to engage the high ratio gears, the lock lever 118 rising to hold the finger 91 stationary. During said revolution of the cam 69, the lever 96 is forced forward, thus permitting the spring 136 (Fig. 7) to revolve the step lever 103 clockwise until its right extremity is stopped by the rear wall of the cupped cover 105. The step 113 thus moving rearward releases the nose end 116 of the check bar, permitting the said bar to move to its lower plane due to the tendency of the blade spring 142 to seek its normal checking contact with the stop blade 144 (Fig. 8). The plate 131 however, did not move with the step lever since it is locked in place by lock lever 118. The foregoing movements take place in a split second.

The pedal 177 continues in its retraction or clutch-engaging motion, revolving the lever 152 clockwise until the clutch becomes fully engaged, as graduatedly controlled by the car driver. It has been described that the effective clutch plate pressure engagement movement of the control pedal is comparatively long, due to the spring 158 (Fig. 17), conducive to a well-graduated clutch engagement, though the total pedal stroke, adapted for convenient heel-resting, be short. The car thus proceeds in high gear; and the driver may continue to rest the forepart of his foot on the low-positioned pedal, without danger of clutch-riding evils, as described.

To shift from high to intermediate ratio, the driver with his foot still on the right side of the tiltable foot plate, fully depresses the pedal, thus disengaging the clutch through counterclockwise revolution of the lever 163, which at the end of such movement pulls the valve rod 246 (Figs. 16 and 18) forward causing vacuum to enter the motor 228, causing the shaft 74 to revolve counterclockwise to revolve cam 69 clockwise for disengagement of the high ratio gears. Thereby the spring 95 becomes free to revolve the step lever 103 counterclockwise as far as it can, namely until its step 114 is checked by bar 116 corresponding to intermediate ratio position. Said movement of the step lever occurs while the gears are becoming disengaged. Therefore the plate 131 constantly comoving with the finger 91 remains stationary until the lock lever 118 releases the finger 91 at the very end of the gear-disengagement motion. Said lock release permits the spring 136 to force the plate 131 into its normal relation with the step lever, thus positioning the shifter 60 into its intermediate ratio position. This implies that the plate 131 revolves counterclockwise one position which would cause its hole 140 to vertically align with the button 143 as dotted-outlined in Fig. 7. However the button 143 will not yet rise into 140, because the step lever's position impedes the upward positioning of the end 116 of the check bar.

The afore-mentioned movement of the step lever 103 until its step 114 contacts the bar 116, simultaneously causes the synchronizer bar 217 (Fig. 3) to become preset for intermediate gear synchronization, namely, into the position where projection 218 is just over the surface 215, and the projection 219 is just to the rear and clear of the surface 216. This is due to the fact that the synchronizer bar 217 in its said setting movement comoves with the lever 96, itself comoving with the step lever 103; the motion of the whole being checked by the check bar end 116, the motion being urged by spring 95. Continued counterclockwise revolution of the shaft 74, as energized by the suction motor will therefore revolve the sleeve 207 counterclockwise for intermediate gear synchronization. The whole operation just mentioned occurs quickly. However, the slight natural pause at the bottom of the pedal stroke for reversing the pedal movement adds time-element effectiveness to the synchronization function, which is suitably heavily powered, the pressure depending on tension of the spring 233 (Fig. 18).

To engage the thus selected intermediate gears, the driver permits the pedal to retract, as above outlined for the high gear engagement. This implies that the step lever 103 is again revolved clockwise to its extreme position, thus permitting the check bar end 116 to rise in its upper plane, urged by the small blade spring 145 (shown in Fig. 9), and as due to the vertical alignment of the button 143 with the hole 140, permitting it to rise therein. The lock lever 118 retains the plate 131 immovable. After the car driver has graduatedly engaged the clutch by controlled pedal retraction, as explained above for the high gear ratio, the car proceeds in intermediate gear ratio.

For shifting back from intermediate to high gear, the driver depresses the pedal fully, with the foot pressure predominance remaining on the right side of the tiltable foot plate during all of the above described operations, thus causing the power to revolve the shaft 74 counterclockwise to disengage the intermediate gears, thereby permitting the spring 95 again to revolve the step lever 103 counterclockwise as far as it can, namely until its step 113 contacts the check bar end 116. At the very end of the gear-disengagement movement of the shift train, the lock lever 118 again releases the finger 91, thus permitting the spring 136 to move the plate 131 into its normal relation with the step lever 103, corresponding to the position shown in Fig. 7. During said movement of the plate 131, the button 143 is forced out of the hole 140 on the button's conically inclined surface, thereby flexing the blade spring 142 as shown in Fig. 8, which view has positions corresponding to those of Fig. 7. Thus have we completely traced a cycle of automatic ratio alternation determination and shifting, for high to intermediate and back to high, with the identical operation on part of the car driver.

For determination of the neutral and low positions, the other mutually alternating set, the driver tilts the foot plate of the pedal with predominant pressure on the plate's left side (as viewed by driver), usually accomplished with the same foot-directional stroke which depresses the pedal. This forces the check bar 106 and 116 to its left position causing the button 143 necessarily to ride beneath the plate 131, because there is no perforation or hole in the zone leftward of the hole 140. Subsequent power shifting due to pedal depression fully would revolve the plate 131 clockwise after the lock lever 118 is released, as a follow-up of the position of the step lever 103, the step 113 of which has been stopped against the forward wall of the cupped cover 105, since the button 143 and the unimpeded check bar 106 and 116 are in their lower levels, as above indicated. It should be remembered that the step lever 103 is always in its rearmost extreme position, therefore not impeding the check bar, when the gears are in engagement, namely when the pedal is released; the neutral position in this respect being just like a ratio engagement. The step 113 thus contacting the wall of cover 105, corresponds to neutral determination, as clear from the description. The subsequent successive alternations would occur between neutral and low gear ratios or positions involving the hole 141, in similar manner as above described for hole 140. Neutral has a full-fledged position as that of a positive ratio, the difference being that the shifter 60 when set for neutral rotates in a clear vacant space so as not to move either of the shifter rods 35 or 50 (Fig. 4).

For reverse ratio selection, the car driver pulls out the manual button 196 (Fig. 14) while the pedal is being depressed to supply power actuation of the shifting. It is required that said button 196 is held out while the lock lever 118 reengages the finger 91. The hand force has thus revolved the plate 131 counterclockwise to the position shown in Fig. 13, against all other resistant tensions. Said reverse selection and ratio can be obtained any time at will, independent of the prior setting of the device, and also independent of the tilted plate position, the Fig. 13 incidentally indicating, that before pulling the button 196, the car driver had already depressed the pedal fully thereby having disengaged the gears (more precisely has disengaged from neutral), so that the low gear ratio, indicated by step 115 (Fig. 13) would subsequently have been engaged had the driver not after such pedal depression pulled out the button 196. (Views 9, 11 and 13 alone do not correspond in their full outlines with the remaining views.)

The foot can normally feel the point of the pedal stroke where the resistance of the valve rod 246 (Figs. 16 and 18) comes into play; the pedal being fairly light pressured because of the clutch assister disclosed in Figs. 16 and 17, notwithstanding the leverage induced by the pedal's exceedingly short stroke. Therefore when the gears are shifted while the car is stopped, the force of the valve spring registered in the said valve rod 246 would tend to carry the pedal back only a very short distance felt by the driver, and the pedal may be held there without clutch reengagement until ready for car progress. It has been described also that the pedal may be depressed at any time to the just mentioned position for more clutch disengagement without ratio changing. It has also been described that the mutual interlocking relation between the lever arm 163 (Figs. 16 and 17) and the power lever 76 necessitates that the gear shifting occurs only after the clutch has been disengaged, which condition is furthermore assured by the relation of the valve rod 246 with arm 174 (Figs. 16 and 18); and also that the clutch cannot be reengaged until after the power shifting is completed.

It becomes apparent from the disclosure that notwithstanding the two sets of optional alternations of ratio positions, any of the five positions of reverse, neutral, low, intermediate and high, can at will be obtained directly at any particular time, with the exception of one position. And that excepted one position can be obtained also at any time by indirection, namely by a double throw of the pedal through its very short shifting range, without intervening clutch engagement. For example, when driving in high gear ratio, any other position can be obtained, except low directly. To obtain such low, the pedal is depressed with predominant foot pressure on the left side of the tiltable foot plate, then left back slightly (unless the gears are wished to be spun) and then depressed again. The neutral, intermediate and reverse can be obtained at any time directly. It was found that the device responds well to traffic requirements. For level road driving, the car driver may constantly keep his foot pressure or position on the right side of the tiltable foot plate, just as though it were a rigid pedal plate; the pedal being of a convenient foot-rest heighth and the evils of clutch-riding being eliminated, being conducive to such convenient foot operation and positioning.

Having thus described a preferred embodiment of my invention, I claim:

1. In a motor vehicle having a clutch and a ratio change device for positive driving and neutral ratio positions, a controller arranged for selectively diverse driver operation in respect to ratio changes, determining means adapted to direct automatic succession of certain two ratio positions upon identical successive operation of said controller, said determining means including structure positioned by the preceding operation cycle so that a certain one of said two ratios is determined only directly following the determination of the other, power actuating means to effect the changes, a power control connection between said last means and said controller causing the ratio changes to be effected at will of the driver as directed, and means whereby the ratio changes are effected only after the clutch has been effectually disengaged.

2. In a motor vehicle having a clutch and a ratio change device with gear elements shiftable for positive driving and neutral ratio positions, a driver-operable pedal adapted to be selectively diversely operable in respect to ratio changes, ratio determining means selectively controlled thereby and arranged to automatically direct successive alternation between certain two ratios upon identical successive operation of the pedal, power actuating means connected to move said elements into said ratios, control connections between said pedal and last means to cause the effective ratio change at will upon successive operation of said pedal, and connections arranged to assure the effectual clutch disengagement before the ratio change operation.

3. In an automobile having a clutch and a ratio change device with movable gear elements one of which is shiftable into either of two directions for two ratio positions, a driver operable element-selecting and change-effecting controller, ratio determining means selectively controlled thereby and arranged to automatically direct successive movements of said gear element into its said two directions upon identical successive driver operation of the controller, power actuating means for thus moving said element, control connections for applying said last means at will by driver operation of said controller, and connections with said clutch whereby the driver actuation of said controller actuates the clutch disengagement.

4. In an automobile having a clutch and a ratio change device with shiftable gear elements for neutral, low and other ratio positions, an optionally diversely driver operable controller, ratio determining means optionally selected thereby and constructed to automatically direct successive progression between the neutral and low ratios upon identical successive operation of said controller at will, power means controllably associated with said controller for effecting said two ratios, and means adapted to assure the effectual clutch disengagement during the ratio change operation.

5. In a motor vehicle having a clutch and a ratio change device with elements shiftable for positive driving and neutral ratio positions, a controller mounted and constructed for selectively diverse foot operation, ratio determining means arranged to automatically direct repeated consecutive alternation between certain two ratios upon identical consecutive operation of said controller and arranged further to direct ratio changing into other than said two ratios by other driver operation of the controller, power actuating means with controller connections effecting at will of the driver said ratio positions, and means whereby the clutch is disengaged effectually upon said controller's operation and prior to the ratio change operation.

6. In a motor vehicle having a clutch and a variable driving ratio device for forward and reverse driving and neutral ratio positions, a driver operated pedal, ratio determining means arranged to automatically direct consecutive alternation between certain two forward driving ratios, supplemental reverse ratio determining means driver operated remotely in respect to said pedal, fluid power actuating means with connections arranged to effect the directed ratios at will by driver operation of said pedal, and connections associating said clutch with said pedal whereby the ratio change operation is effected after the clutch has been effectually disengaged.

7. In a motor vehicle having a clutch and a driving ratio device for a plurality of ratio change positions, a pedal controller including an element adapted to be selectively positioned by foot relative to the body of the pedal, ratio determining means connected to be controlled by such relative positioning for automatically directing consecutive alternation between certain two ratios, directed ratio effecting means operable at will upon the bodily movement of said controller, and connections arranged to effect also the clutch disengagement effectually upon said bodily controller movement and prior to the ratio change operation, the parts of said pedal controller being constructed and mounted so that substantially the same directional foot pressure operates said selective element positioning and said bodily movement.

8. In a motor vehicle having a clutch, a ratio change device for positive driving and neutral ratios, and selection positioning and positionable members for ratio determination of automatic successive progression between certain two ratios, a driver operated clutch disengagement and engagement controller constructed and positioned for foot operation, fluid power motive means arranged to effect a determined ratio change upon driver operation of, and after the clutch disengagement operation by, said controller, and a clutch operation movement disproportioning mechanism whereby the clutch engaging movement is disproportioned relative to the movement of said controller so as to be comparatively small during the variable driving pressure stage of the clutch engagement.

9. In a motor vehicle having a clutch, a ratio change device for positive driving and neutral ratio positions, and a selection determination element associated with a foot operated change-selecting pedal, power means arranged to effect the determined ratio change, mechanism to priorly frictionally synchronize the relative peripheral gear speeds for said ratio change and operating means therefor, said mechanism having connection to the ratio determination element whereby the latter element effects a prefunctional setting of said synchronizing operating means, and said operating means having association with said power means for subsequently effecting the synchronization as determined, and means whereby driver operation of said pedal selectively controls the determining element and causes the clutch disengagement and the effectuation of the change and associated synchronization.

10. In a motor vehicle having a clutch, a ratio change device for positive driving and neutral ratio positions, and a selection determination element associated with a driver operated change-selecting controller, a fluid power motor connected to effect the ratio change as determined, mechanism to priorly synchronize the relative peripheral gear speeds for said ratio change and operating means therefor, said mechanism having connection with the ratio determination element whereby the latter element effects a prefunctional setting of said synchronizing operating means and said operating means having further connection with said motor for subsequently effecting the synchronization as determined, and control connections whereby driver operation of said controller at will, disengages the clutch, selectively controls the determining element and causes the effectuation of the ratio change and associated synchronization.

11. In a motor vehicle having a clutch, a ratio change device for positive driving and neutral ratio positions, a driver operated change-selecting controller, and a ratio determining element associated with said controller selectively and constructed to automatically direct successive progression between certain two ratios upon identical successive operation of said controller, power means arranged to effect the directed ratio change, mechanism to priorly frictionally synchronize the relative peripheral gear speeds for said two ratios and operating means therefor, said operating means having connection to the ratio determination element whereby the latter element effects a pre-functional setting of said synchronizing operating means, said operating means having association with said power means for subsequently effecting synchronization as determined, and means whereby driver operation of said controller at will disengages the clutch, selectively establishes the functional association of the said ratio determining element with said certain two ratios and causes the effectuation of the ratio change and the associated synchronization.

12. In a motor vehicle having a clutch and a ratio change device with gear elements shiftable into various ratio positions, fluid power actuating means, ratio determination members including an intermediate actuation distributor means positionable and forming a selective connecting means whereby to transmit power from said power means distributively to the respective gear elements, connections from said power means to energize said intermediate connecting means and subsequently effect the ratio engaging movement of said intermediate means, a driver operated controller adapted to apply said power actuation at will to effect the changes, and means whereby the clutch is effectually disengaged prior to the ratio change operation.

13. In a driving ratio change system for a vehicle having a clutch and a variable driving ratio device for a plurality of positive driving and neutral ratio positions, a change selecting driver operated clutch controller, a ratio determination mechanism having an element positioned by the immediately prior ratio changing operation and having a further element connected to be operated by said controller in cooperation with said first element to automatically direct consecutive engagement of certain two of said positions upon identical successive operation of said controller and constructed to direct engagement of a definite one of said two positions only immediately after the other has been priorly directed, and power means to effect said engagement arranged to be effective at will, upon the respective operation of said controller for each ratio change.

14. In a motor vehicle having a clutch and a ratio change device for at least four ratio positions including neutral, power means adapted to effect said positions, a diversely foot operable controller, position determining means associated with said controller and adapted to direct consecutive progression between certain two positions upon identical successive foot operation of said controller, and to further similarly direct consecutive progression between certain two other positions upon another kind of identical successive operation of said controller, and means whereby the change is effected only after clutch disengagement.

15. In a gear ratio change system for a plurality of driving ratio changes in a motor vehicle, gears differently engageable for different ratios, mechanism to precedently synchronize the relative peripheral speeds of the gears, subsequent ratio determining means, means connected with said determining means whereby the determining means is adapted to determine also the synchronization, power means to effect engagement of said gears as determined, and a single self-sufficient driver operated controller having connection with the aforesaid combination of elements adapted to cause at will, upon separate controller operation for each of said ratios, the operation of said determining means, said mechanism and subsequently said engaging means.

16. In a gear ratio change system, means to disengage and engage different gears, means to priorly synchronize subsequently engageable gears, means to determine the subsequent ratio, a driver operated reciprocating controller for said engaging and synchronizing means with connections adapted to cause disengagement of a prior ratio and effectively apply the synchronizing means upon one direction of the controller's motion, then to release the synchronizing means and engage the subsequent ratio upon the reverse direction of its motion thereby providing a time pause, a clutch, and means whereby the ratio change is effected only after the clutch has been effectually disengaged.

17. In a driving ratio change system for a vehicle having a clutch and a ratio change device, gears for different ratios, power means to disengage and engage the different gears, means associated with said power means to priorly synchronize sets of subsequently engageable gears, means to determine the subsequent ratio, a driver operated reciprocating controller adapted to control the power means for disengagement of a prior ratio and application of the synchronizing means upon one direction of the controller's motion, and to release the synchronizing means and to engage the subsequent ratio upon the reverse direction of its motion, and means adapted to disengage the clutch before the ratio change operation.

18. In a motor vehicle driven by a prime mover, a driving ratio change device for neutral and various positive driving relations, means to determine a definite ratio change subsequent to an existing one of the aforesaid ratio positions, shifting means to execute the changes as determined, and power means distinct from said prime mover and connected to be applicable by the driver at will, for energizing the positioning of the said determining means for said subsequent change and operating said shifting means to effect the same.

19. In a motor vehicle having an internal combustion engine, a driving ratio change device having in combination subsequent definite ratio determining means comprising a first element positionable by the prior ratio change operation and a second element adapted to be positioned in accordance with the position of said first element, shifting means to effect the ratio as determined, a single fluid power motor adapted to be energized by differential pressure supplied by the intake manifold of said engine and arranged to effect the operation of said shifting means, and means whereby said motor energizes the positioning of said second element.

20. In a driving ratio change system having a clutch and a ratio change device for positive and neutral driving ratios, shiftable elements shiftable for a plurality of driving ratios, a single-action power motor adapted to move said elements, positionable means to differently apply said motor to said elements to effect the ratios, and mechanical connections adapted to be energized by said motor whereby to effect the positioning of the said positionable means.

21. In a driving ratio change device having neutral and a plurality of positive ratio positions, power means adapted to actuate said device into said positions, and subsequent position selection means including a diversely settable selection pedal, position determining means associated with said pedal and adapted to become disposed to automatically direct consecutive progression between certain two positions by one selective setting of said pedal, and to become further disposed to direct ratio changing into other than said two positions by another selective setting of said pedal.

23. In a driving ratio change system for a a plurality of ratio positions, position selection means, including a selector pedal having diversely settable means adapted to be optionally positionable by and according to substantially laterally selective placement of the foot on the pedal, and ratio determining means associated with said positionable means adapted to automatically direct consecutive progression between certain two ratio positions with identical setting of said positionable means, and to direct ratio changing into other than said two positions by other setting of said positionable means.

23. In a driving ration change system for a vehicle having a clutch and a ratio change device for neutral and a plurality of positive driving ratio positions, a controller constructed and positioned for foot operation, subsequent ratio determining means associated therewith and arranged to automatically direct successive engagement of a certain two of said ratios upon identical successive foot operation of said controller, power means adapted to effect said ratios as determined, and further control means remote to said controller for determining at least one other position.

24. In a driving ratio change system, a change selecting controller constructed and positioned for foot operation, subsequent ratio determining means associated with said controller and arranged to automatically direct consecutive progression between certain two ratios upon identical successive operation of said controller, power means adapted to effect said two ratios as determined, and optional additional driver actuated means adapted to effect said ratios as substitute for said power.

25. In a driving ratio change system for a vehicle having a variable ratio device for a plurality of driving ratio positions, subsequent position determining means constructed to automatically direct ratio changing into certain two positions consecutively and to further direct ratio changing into other positions, power means adapted to effect all of said positions, and a single self-sufficient driver operated controller arranged optionally to select the operation of said determining means either for said two positions or for said other positions and to cause the effectual application of said power means for effecting said positions.

26. In a driving ratio change system for a vehicle having an engine, a variable driving ratio change device, and a clutch between said engine and device, a selectively settable clutch pedal, subsequent ratio determining means arranged to automatically direct succession of certain two ratio positions upon identical selective setting of said pedal, and to direct ratio changing into at least one other ratio position upon another selective setting of said pedal, clutch control connection to disengage the clutch upon initial depression of said pedal, ratio change effecting power means operable upon further movement of said pedal, and construction whereby the selecting function of said pedal is optionally operable during its said initial depression.

27. In a ratio change system for a motor vehicle having a prime mover and arranged for a plurality of ratio changes, shifting means to effect the ratio changes, separate fluid power means to actuate said shifting means, ratio determining means adapted to be energized by said fluid power means and to determine the subsequent ratio, and a single driver operated controller adapted to self-sufficiently control the operation of all of said means for a plurality of ratio changes.

28. In a driving ratio change system, elements movable into various effective driving ratio positions, a driver operated controller, subsequent ratio determining means arranged to automatically direct progression between certain two ratios upon identical successive operation of said controller, power means arranged to be applied upon operation of said controller to effect the ratio changes as directed, and a remote visual indicator mounted in normal view of the driver connected to register the selected ratio.

29. In a driving ratio changing system for a vehicle having an engine, a variable gear transmission, and a clutch between said engine and transmission, a clutch control pedal, a selector mounted thereon and movable in respect to said pedal into different selective positions by the foot operating said pedal, a ratio determining mechanism having connection with said selector and arranged to automatically determine progression between certain two ratios with identical position of said selector, and means controlled by the bodily movement of said pedal to effect the ratios as determined, said selector being mounted on said pedal, so that the same directional foot movement positions said selector and bodily moves the pedal to cause the ratio change to be effected.

30. In a motor vehicle ratio change device having an element movable in either direction from mid-position for two ratio positions, a rock shaft, two oppositely disposed effectual lever arms on and rocking with the shaft and adapted to move said element in either of said directions by engagement with said arms in one direction of rock, and two further oppositely disposed effectual lever arms mounted on and rocking with the shaft adapted to engage said element to move it to mid-position by the other direction of rock of the shaft.

31. In a motor vehicle ratio change device having a shift member movable from mid-position in opposite directions for two ratio positions, a rock shaft, a member having two oppositely disposed effectual lever arms and being selectively slidably positionable on and rocking with the shaft for selective registration of either of said arms with cooperating portions of said element so as to move said element in either of its said directions by a single direction of rock of said shaft, a lock element adapted to retain said armed member in selected position on said shaft, and means whereby the rocking of said shaft operates the lock element for lock release.

32. In a motor vehicle having a clutch and a driving ratio change device, ratio determining means, power means adapted to effect the ratio changes as determined, a driver-operated controller arranged to control the disengagement and re-engagement of the clutch and to apply the power means for the ratio changes, and a clutch operation movement disproportioning means whereby the effectual clutch engaging movement is disproportioned relative to the movement of said controller so as to be comparatively small during the variable driving pressure stage of the clutch engagement.

BERNARD HY. MOSSINGHOFF.